US008341752B2

(12) United States Patent
Naressi et al.

(10) Patent No.: US 8,341,752 B2
(45) Date of Patent: Dec. 25, 2012

(54) RFID ENABLED MEDIA SYSTEM AND METHOD THAT PROVIDES DYNAMIC DOWNLOADABLE MEDIA CONTENT

(75) Inventors: Alexandre Naressi, Antibes (FR); Patrice Fauvet, Cannes (FR)

(73) Assignee: Accenture Global Services Limited, Dublin (IE)

( * ) Notice: Subject to any disclaimer, the term of this patent is extended or adjusted under 35 U.S.C. 154(b) by 696 days.

(21) Appl. No.: 10/598,387

(22) PCT Filed: Feb. 25, 2004
(Under 37 CFR 1.47)

(86) PCT No.: PCT/EP2004/005399
§ 371 (c)(1),
(2), (4) Date: Sep. 23, 2008

(87) PCT Pub. No.: WO2005/081087
PCT Pub. Date: Sep. 1, 2005

(65) Prior Publication Data
US 2009/0085724 A1 Apr. 2, 2009

(51) Int. Cl.
*H04L 29/06* (2006.01)
(52) U.S. Cl. .................. 726/27; 340/10.6; 340/572.1
(58) Field of Classification Search .................. 380/30, 380/205; 713/168, 180; 340/572.1
See application file for complete search history.

(56) References Cited

U.S. PATENT DOCUMENTS

| 5,822,714 A | 10/1998 | Cato |
| 6,008,727 A | 12/1999 | Want et al. |
| 6,044,046 A | 3/2000 | Diezmann |
| 6,130,623 A | 10/2000 | Maclellan et al. |
| 6,201,474 B1 | 3/2001 | Brady |
| 6,340,931 B1 | 1/2002 | Harrison |
| 6,424,715 B1 | 7/2002 | Saito |
| 6,798,349 B1 | 9/2004 | Richley et al. |
| 6,828,902 B2 | 12/2004 | Casden |
| 6,840,444 B2 | 1/2005 | Pierce et al. |

(Continued)

FOREIGN PATENT DOCUMENTS

EP 1862982 * 12/2007

(Continued)

OTHER PUBLICATIONS

Hossein, "Location-Based System for Mobile Devices Using RFID", 2008, IEEE Computer Society, p. 291-296.*

(Continued)

*Primary Examiner* — Taghi Arani
*Assistant Examiner* — Gregory Lane
(74) *Attorney, Agent, or Firm* — Vedder Price PC

(57) ABSTRACT

An audio and/or video media content providing device includes a controller, such as a server, that is responsive to RFID tag based information obtained from a remote RFID enabled media object. The controller is operative to facilitate access to media content associated with a stored periodically changing media content list. For example, a content registry database may be periodically updated through a suitable user interface to change a link between content identification information read from a remote RFID enabled media object, with media application information so that the same RFID tag may allow the downloading of different media. The link between the content ID and the media ID may be dynamically changed through the controller. This may be advantageous, to provide for example, a Top 10 song card or other RFID enabled object that stays the same but can be used to securely download different media over time.

11 Claims, 18 Drawing Sheets

U.S. PATENT DOCUMENTS

| | | | |
|---|---|---|---|
| 7,038,985 | B2 | 5/2006 | Ryal |
| 7,325,145 | B1 | 1/2008 | England |
| 2001/0013830 | A1 | 8/2001 | Garber et al. |
| 2003/0001016 | A1* | 1/2003 | Fraier et al. ............... 235/462.03 |
| 2003/0001887 | A1 | 1/2003 | Smith |
| 2003/0023578 | A1 | 1/2003 | Durand et al. |
| 2003/0024975 | A1 | 2/2003 | Ramasekharan |
| 2003/0030568 | A1 | 2/2003 | Lastinger et al. |
| 2003/0037243 | A1 | 2/2003 | Gruteser et al. |
| 2003/0206107 | A1* | 11/2003 | Goff et al. .................. 340/572.7 |
| 2004/0002305 | A1 | 1/2004 | Byman-Kiviyuori |
| 2004/0002904 | A1* | 1/2004 | Deas et al. ....................... 705/27 |
| 2004/0008209 | A1* | 1/2004 | Adams et al. ................. 345/619 |
| 2004/0010708 | A1* | 1/2004 | Johnson et al. ............... 713/200 |
| 2004/0024642 | A1 | 2/2004 | Sidlo et al. |
| 2004/0087273 | A1* | 5/2004 | Perttila et al. ................ 455/41.2 |
| 2005/0001719 | A1 | 1/2005 | Aupperle et al. |
| 2005/0083181 | A1 | 4/2005 | Jalkanen et al. |
| 2005/0144253 | A1 | 6/2005 | Yoshino |
| 2005/0162277 | A1* | 7/2005 | Teplitxky et al. .......... 340/572.8 |
| 2005/0237886 | A1 | 10/2005 | Kahlman |
| 2006/0047603 | A1 | 3/2006 | Fontijn |
| 2006/0059533 | A1 | 3/2006 | Aerts |
| 2006/0158341 | A1 | 7/2006 | Chipchase et al. |

FOREIGN PATENT DOCUMENTS

| | | | |
|---|---|---|---|
| WO | WO 02/37246 | A2 | 5/2002 |
| WO | WO 03/034192 | A1 | 4/2003 |
| WO | WO 03/102741 | A2 | 12/2003 |
| WO | WO 2004/006257 | A1 | 1/2004 |
| WO | WO 2004/006259 | A1 | 1/2004 |
| WO | WO 2004/038567 | A1 | 5/2004 |
| WO | WO 2005/081086 | A1 | 9/2005 |
| WO | WO 2005/081087 | A1 | 9/2005 |
| WO | WO 2005/081088 | A1 | 9/2005 |

OTHER PUBLICATIONS

European Office Action for European Application No. 04714330.0, Sep. 23, 2009, 7 pp.

Examiner's First Report issued in Australian Patent Application 2004316031 on Oct. 9, 2009.

Examiner's Second Report issued in Australian Patent Application 2004316031 on Oct. 22, 2010.

European Search Report in Application 04739260.0 issued Jan. 13, 2010.

Examiner's First Report issued in Australian Application 2004316032 on Nov. 9, 2009.

Examiner's Second Report issued in Australian Application 2004316032 on Dec. 21, 2010.

Examiner's First Report issued in Australian Application 2004316030 on Nov. 11, 2009.

Examiner's Third Report issued in AU 2004316032 on Jul. 12, 2011.

* cited by examiner

RFID ENABLED MEDIA SYSTEM AND METHOD THAT PROVIDES DYNAMIC DOWNLOADABLE MEDIA CONTENT

FIELD OF THE INVENTION

The invention relates generally to systems and methods that allow the remote downloading of media and content, and more particularly to radio frequency identification tag devices and methods that allow downloading of media and content.

BACKGROUND OF THE INVENTION

Radio frequency identification tag (RFID) based technology is well known and is employed in systems such as those that track the location of inventory. RFID tags may be microchips, or other suitable structure and are typically capable of carrying information. For example, the identification tags or RFID tags can be an ultrasonic transmitter and the tag reader can be the ultrasonic transceiver. Upon placing the identification tag in the approximate area of the tag reader transceiver, the tag reader transceiver wirelessly reads the identification associated with the identification tag. Other RFID tag systems are also known that allow the RFID reader to induce energy onto the RFID tag which then powers the RFID tag which then communicates the RFID tag information to the RFID reader. Accordingly, a contact-less wireless communication can occur.

For example, an RFID tag may be placed on an item and when the item leaves a certain location of a store an RFID tag reader that is located at the exit of the store, or other suitable location, activates the RFID tag which contains digital information identifying the product. Other uses of RFID tag technology are also known. For example, as described in U.S. Pat. No. 6,655,586, RFID tags are embedded on pages of a document. Each of the identifier tags identifies the particular page that the person is viewing. By correlating the currently read page to information stored in memory, dynamic content corresponding to the currently read page can be activated. The dynamic content can include, for example, controlling the lighting in a room, sound effects in a room, environmental conditions in a room, or other room conditions to allow a reader to get a environmental changing effect as a book is read. In the multi-page document, dynamic content may be associated with certain pages of the document, such as if the document is a Sunday paper, and the reader turns to page 3, the RFID tag may be read by the RFID tag reader which then causes a computer to communicate with a web server and the web server provides a multimedia restaurant advertisement on the computer that may be seen by the reader of the document. Hence, a programmed general purpose computer with an associated tag reader transceiver are known to be employed with RFID tags that are embedded in pages of documents. However, such systems and devices do not appear to, among other things, inhibit digital piracy or otherwise improve upon how digital media, such as audio and video are purchased or acquired.

Also such systems do not appear to be concerned with the encryption or protection of any information as they typically provide publicly available information to multiple users. For example, with the increasing number of on-line devices and the increased interest in downloadable video and audio content, it would be desirable to provide a device, system or methods that can potentially improve the way digital media is distributed and played.

As such, it is known to provide content, for example, through the internet based on RFID tags embedded on individual pages of a document. However, known RFID tag based systems that employ some type of link to dynamic content, such as advertisements on web sites, does not appear to provide suitable additional incentive for customers to purchase additional RFID enabled objects nor provide a suitable level of customer loyalty that can translate into additional sales and product value.

It would be desirable to have an apparatus, system or method that may provide a mechanism that facilitates, among other things, the collection and maintenance of RFID tag enabled objects or provide vendor loyalty incentives which would be extremely valuable to online content providers and others.

In addition, digital media such as digital video information, including but not limited to movies, games and other video information as well as digital audio information such as digitally stored albums, songs, and other information whether they be on DVDs, CD ROMs, in the form of MP3 files, or any other suitable audio or video file can be purchased on-line and downloaded from a web server when the user enters an account number and password. Their account may then be billed or they may use a credit card to purchase the music. However, this typically requires the user to enter long strings of characters in a keyboard or keypad.

As also known in the art of digital media, CD packages may include printed access codes for example, a web address, that may be used in order to download exclusive content such as music, games and backstage material for bands. However, the unique code is typically text that is written on the CD box and a user must then type in the website address (e.g. URL) and download the content. However, the CD container need not be present when the user is downloading the information and the user may simply read the website address from the CD container without purchasing the CD.

Media players, such as laptop computers, desktop computers, personal digital assistants, hand-held computers, and other devices may include software media file players such as MP3 file players, wma file players and other suitable players to allow a user to listen to digital audio files. They may also include MPEG decoders or other suitable video decoders that decode digital video content and play them from a DVD player that is located, for example, in the device. However, to obtain downloadable content, these devices typically require a user to enter information through some type of user interface, such as a keyboard or touch screen to obtain remote digital media, such as digital audio and/or digital videos.

In addition, the size of digital media containers such as DVD cases and CD cases can take up valuable shelf space and their weight can result in associated shipping costs. It may be desirable to provide a type of digital media package that does not include a digital storage medium such as the CD ROM, DVD or other digital storage medium.

Accordingly, a need exists for a system, device or method that overcomes one or more of the above drawbacks.

BRIEF DESCRIPTION OF THE DRAWINGS

The invention will be more readily understood in view of the following description when accompanied by the below figures and wherein like reference numerals represent like elements.

DETAILED DESCRIPTION OF THE PREFERRED EMBODIMENT

Figure 1:
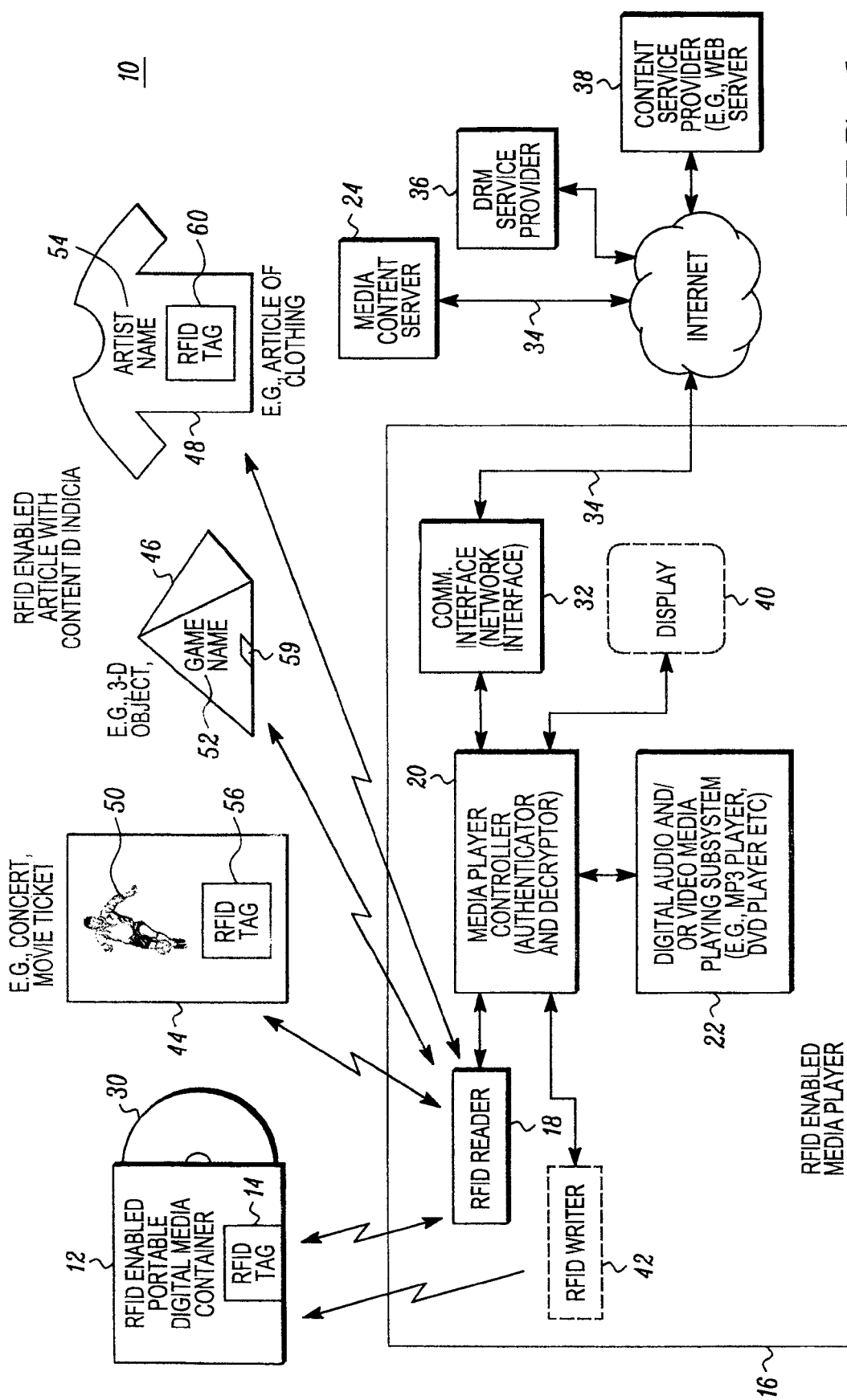
FIG. 1 is a block diagram illustrating one example of a digital media system in accordance with one embodiment to the invention.

Briefly, an audio and/or video media content providing device includes a controller, such as a server, or any other suitable structure, that is responsive to RFID tag based information obtained from a remote RFID enabled media object. The controller is operative to facilitate access to media content associated with a stored periodically changing media content list. For example, a content registry database may be periodically updated through a suitable user interface to change a link between content identification information read from a remote RFID enabled media object, with media application information so that the same RFID tag may allow the downloading of different media. The link between the content ID and the media ID may be dynamically changed through the controller. This may be advantageous, to provide for example, a Top 10 song card that has indicia thereon that may be a title "Top 10 Song Card" and a RFID tag thereon which can be used to download a dynamically changing Top 10 song list that may change monthly or weekly. For example, a subscriber of the service may purchase a single RFID enabled media card and when the card is read by a suitable RFID reader, such as that located in a media playing device, different songs may be downloaded each week from the same card. Other advantages will be recognized by those having ordinary skill in the art.

The dynamic content capability was described above with reference to the population of the content registry database. As such, an operator may vary the linking in the database to associate different media IDs to the same content ID on a periodic basis.

a digital media playing system includes, in one embodiment, a digital video and/or audio media object, such as a portable digital media container adapted to hold one or more digital storage mediums, that includes a radio frequency identification tag containing RFID tag information. The digital media playing system also includes a trusted media content playing device that has a radio frequency identification tag reader operatively coupled therewith, to read the RFID tag information from the RFID tag that is located on the portable media container. The trusted media content playing device securely downloads remotely stored audio and/or video media based on the RFID tag information. The RFID tag information that is stored in the RFID tag includes, in one embodiment, encrypted tag identification information (e.g., tag ID) and unencrypted remote content identification information (e.g., content ID) as well as, if desired, portable digital media container authentication data. By merely placing the container near the trusted media playing device, encrypted media is automatically downloaded from a media server, decrypted and played by the trusted media playing device. No user interaction is necessary to obtain digital audio or video such as movies, songs, albums or other securely protected media. Other advantages will also be recognized by those having ordinary skill in the art.

The RFID tag information may be affixed on or embedded in the portable digital media container to allow contact-less reading by the RFID reader. If desired, the RFID tag may also be located on the digital storage medium itself such as on the CD, DVD or other suitable storage medium if desired. The trusted media content playing device also includes a controller operatively responsive to the RFID information read from the portable digital media container and is also operative to retrieve, from a device at a remote location, such as a media content server (e.g., web server), additional information associated with the portable media content storage device. The additional information may be for example, but is not limited to, encrypted audio and/or video media such as songs, other movie scenes, extra on-line services such as un-encrypted downloadable exclusive content, movie previews, lyrics, video clips, news relating to the digital content, access to chat and forum meetings, photo albums, special offers or any other suitable additional information that is not contained in the storage medium itself or on the digital media container. The media content playing device is operative to play audio and/or video that is retrieved from the remote location or that is contained on the medium that is associated with (such as contained in) the portable media container.

By way of example and not limitation, the media content playing device may be for example, a hi-fi receiver, laptop computer, cable set top box, or other suitable device having a housing with a radio frequency identification tag reader operatively coupled therewith whether internal or external to the housing. For example where the media content playing device is a stereo receiver with a display and a CD drive, a user may play the CD and use the CD case which includes the RFID tag and places the empty CD case on the enhanced stereo receiver which contains the RFID tag reader and may instantly be presented, such as on the display, with extra on-line services such as access to other encrypted songs that the artist did not release on the CD, un-encrypted video clips of the artist, or other information from a web service provider (e.g., server). In addition, encrypted digital media, such as other audio or video may be downloaded from a media server but only if digital rights management criteria has been met. This provides security and thwarts piracy of digital audio and video information that is downloadable (such as downloadable from the Internet or other suitable network).

In one embodiment, the media content playing device retrieves additional information other than information for example located on the media object or contained in a storage medium held by a container, that may include for example digital audio and/or video content that is played by the media content playing device or on-line service information such that the on-line service information requires two-way communication between the content playing device and the device at the remote location. For example, the on-line information may be content that is web-based content and may be chat room pages so that two-way communication may be accomplished.

Other examples of the media content playing device may include, but are not limited to for example, an RFID reader enabled television unit, RFID reader enabled set top box, RFID reader enabled DVD player, and RFID reader enabled portable device, or any other suitable device with an RFID reader and trust relationship with a DRM service provider. If desired, the media content playing device may also include an RFID writer operative to contactlessly write information back to the portable digital media container or object. This way the RFID tag may be updated with information relevant to the provider of the media content, the owner of the container or other entity.

In another embodiment, instead of the container containing the RFID tag, the digital media storage medium itself, such as the CD or DVD or other suitable medium, contains the RFID tag with digital media storage medium authentication information, encrypted RFID tag data and remote content identification data.

In another embodiment, the digital video and/or audio media object includes a hand-held article, such as, but not limited to, a card, ticket, article of clothing, 3-D object, or any other suitable article and includes digital video and/or audio content identification indicia thereon that visually identifies remotely stored digital video and/or audio content. The object also includes an RFID tag containing at least contactlessly transmittable RFID tag identification data and remote digital content identification data. For example, music albums, video games, home videos, movies or any other suitable audio or video information may be manufactured in smaller standardized forms or objects to enable a more efficient transportation and storage of digital media as well as providing a potentially lower cost packaging solution. For example, in one embodiment, movies normally stored on DVDs, instead are sold in the form of movie cards. The card contains content identification indicia, such as the name of the movie, the movie advertisement picture or any other suitable visual information that visually identifies the movie (e.g., remotely stored and downloadable digital video and/or audio content related to the content identification indicia). The movie card also includes an RFID tag that contains RFID tag data and remote digital content identification data wherein the remote digital content identification data may be, for example, an URL of the web server that contains the remotely stored and downloadable movie, or may be for example the name of the movie or other information to identify which movie is to be provided by a remote media content server. The movie is retrieved and starts playing when the corresponding card is placed on the enhanced (e.g., RFID reader enabled) media content playing device which reads the RFID tag information and obtains a downloadable version of the movie. As such, conventional movie containers such as DVD cases no longer need to be used. Instead movie cards may be used in stores and elsewhere and the user can obtain the movie or audio when they return home or when they go to a kiosk or other locations containing a trusted media playing device capable of downloading the movie or other media content.

In another embodiment, other articles are also disclosed such as enhanced concert tickets that may be a combination of conventional concert tickets with the RFID tag which then allows a holder of the ticket, after the concert or before the concert, to hold the enhanced ticket by a trusted media content playing device to gain access to exclusive songs that were recorded live, a preview of the band's video clips, or other downloadable media.

The media content playing device is a trusted device and includes cryptographic engines to facilitate the secure download of digital media as well as providing requisite authentication with the DRM service provider and providing authentication of the portable digital media container or RFID enabled hand-held article to provide safeguards against potential piracy.

In another embodiment, a system for selecting digital content from at least one content source employs a plurality of RFID enabled objects that are read by one or more RFID readers. The RFID enabled objects may be, for example, RFID enabled media objects or RFID enabled non-media objects, such as any suitable RFID enabled object. In this embodiment, specific combinations of RFID tags and RFID enabled objects, or RFID enabled media objects provide access to more (or different) digital content than the same tags provide alone. Accordingly, the combination of RFID tags may indicate to a network element (e.g., server or other element), such as a digital rights management service provider or other network element, that a different mix of media or content should be authorized for download by a content playing device, such as a media playing device or other suitable device. For example, two RFID enabled objects that are placed near the RFID reader (such as a media playing device or other device) are read and the combination of the content IDs are interpreted by the network element to mean that content (or media) other than the content (or media) normally sent in connection with each of the content IDs individually should now be approved for access by the content playing device. Such a system can be advantageous, for example, to enhance customer loyalty and improve the sales of products where, for example, an owner may be rewarded by obtaining a plurality of RFID enabled media objects or RFID enabled objects. For example, bonus content may be available when two or more media objects are owned and placed for detection by the media playing device 16 as opposed to a single media object. The bonus content and services can be changed over time and get updated dynamically by the network element, such as by updating database entries through an user interface.

One example of where such a system can be employed may be where the media object represents one episode of a movie trilogy and a second media object represents the second movie of a movie trilogy. The owner may play the movies individually by placing the individual media objects near the enhanced media player. When the last episode is released, and the owner purchases the media object associated with the third movie of the trilogy and hence completes his collection, the user downloads the third episode by placing the last purchased RFID tagged media object near the enhanced media player. However, by simultaneously or sequentially placing all three RFID tagged objects on or near the enhanced media playing device, the owner gets instant access to bonus media and/or content such as alternate movie scenes, actor interviews or any other suitable bonus content whether it be encrypted media or unencrypted information. As such, specific combinations of RFID enabled objects including non-media objects, may provide access to different digital rights than those that the same objects provide alone.

In addition, the combination of RFID enabled objects may be presented to the RFID reader in a certain sequence or order wherein the sequence of RFID enabled objects as presented to the media playing device indicates different media content. For example, a set of media objects sold separately may, when assembled in a certain way, provide access to particular media or content but by assembling them in a different way, provide access to other media or content. The resulting media or content is evoked by the sequence of presenting the media objects to the RFID reader or readers of the media or content playing device. As such, not only does the combination indicate different media accessibility than the objects alone, but the arrangement (e.g. sequence) of the combined, RFID enabled objects may also indicate different digital rights or access to different media or content.

FIG. 1 is a block diagram illustrating one example of a digital media system 10 that employs a digital media playing system that includes a portable digital media container 12 having a radio frequency identification tag 14 that contains RFID tag information. In addition, the digital media playing system includes a media playing device 16 also referred as an RFID enabled media player. The media playing device is preferably a trusted device and includes a radio frequency identification tag reader 18, controller 20 and digital audio and/or video media player subsystem 22. Any suitable RFID technology may be used and in this example, passive RFID tags are described. The RFID tags may be, for example, Rafsec MIFARE label transponders that operate, for example, at 13.56 MHz, or any other suitable RFID tags. For example, the RFID tag may be in chip form which may be attached by a suitable adhesive to an object and may include the requisite antenna and other structure as known in the art. Any suitable amount of memory may be available on the RFID tag as needed.

The RFID readers 18 and writers 42 may be any suitable RFID tag reader or writer, such as a Gemini 2000 MIFARE RFID reader, or any other suitable RFID reader or writers. As used herein, "media" or "Media content" refers at least to digital and/or audio content that is securely communicated (encrypted or sent in a secure manner) or that requires some type of digital right management whereas the word "content" with out the word "media" is used to refer at least to other downloadable content other than for example the digital audio and/or video media information that is sent securely (e.g., streaming information or files or other suitable format). Content identification information or content ID refers to any information that represents media or content. Encryption can include any suitable form of data protection technique including but not limited to the use of sending information over a secure link (e.g. SSL) or ciphered information sent over an unsecure link.

The RFID tag reader 18 is operative to contactlessly read in a secure manner, information from the RFID tag 14 on the portable media container 12, in this example. The controller 20 is operatively responsive to the information read from the portable media container 12 and is operative to retrieve encrypted digital media from a device at a remote location, such as a media content server 24. The media content playing device 16 plays, retrieved audio and/or video from the remote location or contained on a medium 30 associated with the portable media container, using the digital audio and/or video playing subsystem 22.

For purposes of illustration only and not limitation, the portable digital media container 12 may be for example a CD ROM case, DVD case, or any other package that holds or otherwise contains a digital storage medium, such as but not limited to DVDs, CDs, integrated circuit based memory sticks, or any other suitable digital storage medium (e.g. magnetic, electric, optical etc.). The media playing device 16 may be for example a suitably programmed RFID reader enabled television unit, an RFID reader enabled set-top box, an RFID reader enabled DVD player, an RFID reader enabled portable audio or video playing device, such as an MP3 player or any other suitable RFID reader enabled media player that plays for example digital audio and/or video media. Digital audio and/or video media includes, but is not limited to digital movies, albums, songs, images or any other suitable information. As shown, the media playing device 16 includes a communication interface 32 such as a network interface to allow the media playing device to communicate with one or more networks including for example, the internet or any other suitable network. The communication interface 32, may be any known communication interface and preferably provides secure communication with the remote device contains the downloaded media such as the media content server 24. As shown, the media content server 24 and the communication interface 32 may be coupled through any suitable links generally designated 34 whether they be land line or wireless links. The media playing device 16 is also in operative communication with a digital rights management service provider 36 which may be one or more servers for example. In addition, the media playing device 16 is also in operative communication with a content service provider 38 which may be for example another web server that provides other content other than the encrypted digital audio and/or video media content provided by the media content server 24. For purposes of illustration, the media content server 24 will be described as a server or other network elements that provide encrypted media such as encrypted audio and/or video media that is to be played by the media playing device 16.

The controller 20 may be implemented in any suitable manner including, but not limited to one or more suitably programmed processors that execute instructions that are stored in associated memory. Alternatively, the controller 20 may be implemented by discrete logic or in any suitable combination of hardware, software or firmware. Similarly, the digital audio and/or video playing subsystem 22 may be implemented as one or more suitably programmed processors that carry out, as known in the art, MP3 files for playback, or any other suitable audio or video stream playback. In addition, the subsystem 22 may be a DVD player, CD player or any other suitable media player. In addition, if desired the media playing device 16 may include a display 40 and an RFID writer 42 to wirelessly write information to be stored on the RFID tag on the RFID enabled portable digital media container 12.

The controller 20, as later described, also includes cryptographic engines to facilitate authentication of the RFID tags if desired and to decrypt retrieved encrypted media from, for example the media content server 24. Once the encrypted media has been decrypted, it is then passed to the digital audio and/or video media playing subsystem 22 to be played.

The RFID tag 14 includes encrypted RFID tag identification information (tag ID) that identifies the tag to the RFID reader and hence system. The remote content identification data identifies content that is remotely downloadable. This is content in addition to the digital content stored on the digital storage medium that the container 12 holds. The RFID tag 14 may also include if desired, digital media container authentication information. The digital media container authentication information may be any suitable electronic authentication information such as but not limited to a digital signature of the trusted DRM service provider 36, or other trusted authority that generated the authentication data for the RFID tag 14. Alternatively, any other suitable mechanism may be also be used for authenticating the RFID tag and hence the RFID enabled portable digital media container. In this example, the RFID tag information or any portion thereof is securely stored in tag memory and can only be read by a trusted RFID reader 18 and written to by a trusted RFID writer. Providing authenticity allows for the DRM service provider 36 and/or other media content providers to trust the RFID enabled object (e.g. that it is not a pirated item). For example, only RFID readers with proper security functions can read the tag information. The RFID tag contains encrypted or secure RFID tag data which uniquely identifies the RFID tag. The remote content identification data may be for example the name of an album, the name of an artist, a location of where the media is ultimately stored, a network locator for a media server, or any other suitable content identification data that identifies in some manner, directly or indirectly, the content or media that is to be remotely downloaded by the RFID enabled media player based on the content of the RFID tag.

It will be recognized that the RFID tag 14, if desired, may also be embedded in or otherwise coupled to the digital storage medium 30 itself as opposed to being placed on a container or embedded with a container. As such a digital media storage such as a DVD, CD, or any other suitable digital storage medium may also have the radio frequency identification tag that can contactlessly provides information to an RFID reader that contains the data representing at least a digital media container authentication information, the encrypted RFID tag data and remote content identification data.

By tagging existing style digital media containers or any suitable style digital media containers with RFID tags that contain secure RFID tag information and secure or unsecure content identification information, owners or users of the RFID enabled portable digital media containers can securely obtain access to additional content or encrypted media by simply placing the container near or on the RFID enabled media player. As such a high-level of security as provided and extra services and content can be accessed when the container is physically present. Access codes cannot usually be simulated since the RFID tag information is encrypted on the RFID tag. Other advantages will be recognized by those having skill in the art. Any other suitable objects that employ an RFID tag that contains secure RFID tag information and remotely downloadable content identification information can be used.

For example as also shown in FIG. 1, other RFID enabled video and/or audio media objects 44, 46, 48 can be used. These RFID enabled objects facilitate the remote downloading of encrypted digital video and/or audio media or non-encrypted information. The digital video and/or media objects 44, 46 and 48 may be for example hand-held articles that have digital video and/or audio content identification indicia thereon designated 50, 52 and 54 respectively. The digital video and/or audio content identification indicia 50, 52 and 54 visually identifies the remotely stored digital video and/or audio content. The hand-held articles each include an RFID tag 56, 58 and 60, respectively, that contain contactlessly transmittable RFID tag information data and remote digital content identification data. For example, the video and/or audio media object 44 in this example is in the form of a concert or a movie ticket with a RFID tag 56 attached thereto and the video and/or audio content identification indicia 50 is an image or logo representing a particular movie or concert. As such, RFID tags can be embedded into paper or other ticket material and can store access keys to extra digital content and services such as replays of the concert, event notifications or other information. By passing the concert ticket close to the RFID enabled media player, the media player then obtains the appropriate downloadable media that was identified by the remote digital content identification data read from the RFID tag once authentication of the RFID tag has been deemed successful. As such, paper concert tickets or other forms of tickets may help users keep a concert ticket as a souvenir. By placing the ticket on any trusted RFID enabled media player, the user can access, for example, a photo gallery of the concert, exclusive songs that were recorded live from the concert as provided by the content service provider server 38 or the media content server 24, a preview of the band's new video clips, discounts on tickets or any other suitable promotion as identified from the remote digital content identification data which may be for example a URL to the content provider or other suitable identifier to obtain the remote media.

Where the hand-held article is a movie ticket, the user may place the ticket in proximity to the RFID reader enabled media player which then obtains the remote digital content identification data which identifies the location of where to obtain a particular movie. The name of the movie is represented for example by the content identification indicia 50. As such there is no need for a digital media container to store the movie since the movie may be securely stored remotely in a remote media content server. As such, an inexpensive paper (or other suitable material) ticket or card that identifies a particular movie and the appropriate RFID tag may be used instead of a container so that a user that purchases the movie ticket from, for example, a bookstore, rental store or other source can use the ticket to download the movie for viewing. Alternatively, the movie ticket may be used so that the actual movie is not obtained but instead scenes not seen before in a movie are downloaded or other information linked to the movie is downloaded.

In a similar manner, other hand-held articles may be used in the same way such as an article of clothing that may include for example the artist's name (i.e. content identification indicia) and suitable RFID tag with the corresponding RFID tag identification information and remote digital content identification information. For example, if the shirt is purchased at a concert, the user may take the article of clothing home, or at the concert, pass it near the RFID enabled media player which then obtains the designated digital content based on the remote digital content identification information. The content identification indicia may represent for example, at least one song remotely stored or at least one movie that is remotely stored, or any other suitable digital audio and/or video information. As such the hand-held article may be for example a card, ticket, apparel, a collectible item, a three-dimensional article or non-three dimensional article.

A three-dimensional object is shown as digital video/audio media object 46. This three-dimensional object may be for example a teddy bear, ball or 3-D game character, with the name of the game identified as the content identification indicia thereon or any suitable content ID indicia. When passed near the RFID enabled media player, remote digital content is obtained based on the retrieved remote digital content identification data stored in the RFID tag which may be for example an entire video game, content relating to the video game such as instructions on how to use the game or any other suitable information that may be obtained through a website. The remotely stored digital video and/or audio content may be content from any suitable source including but not limited to a radio broadcast, television broadcast, a web server or any other suitable content source.

Figure 2:
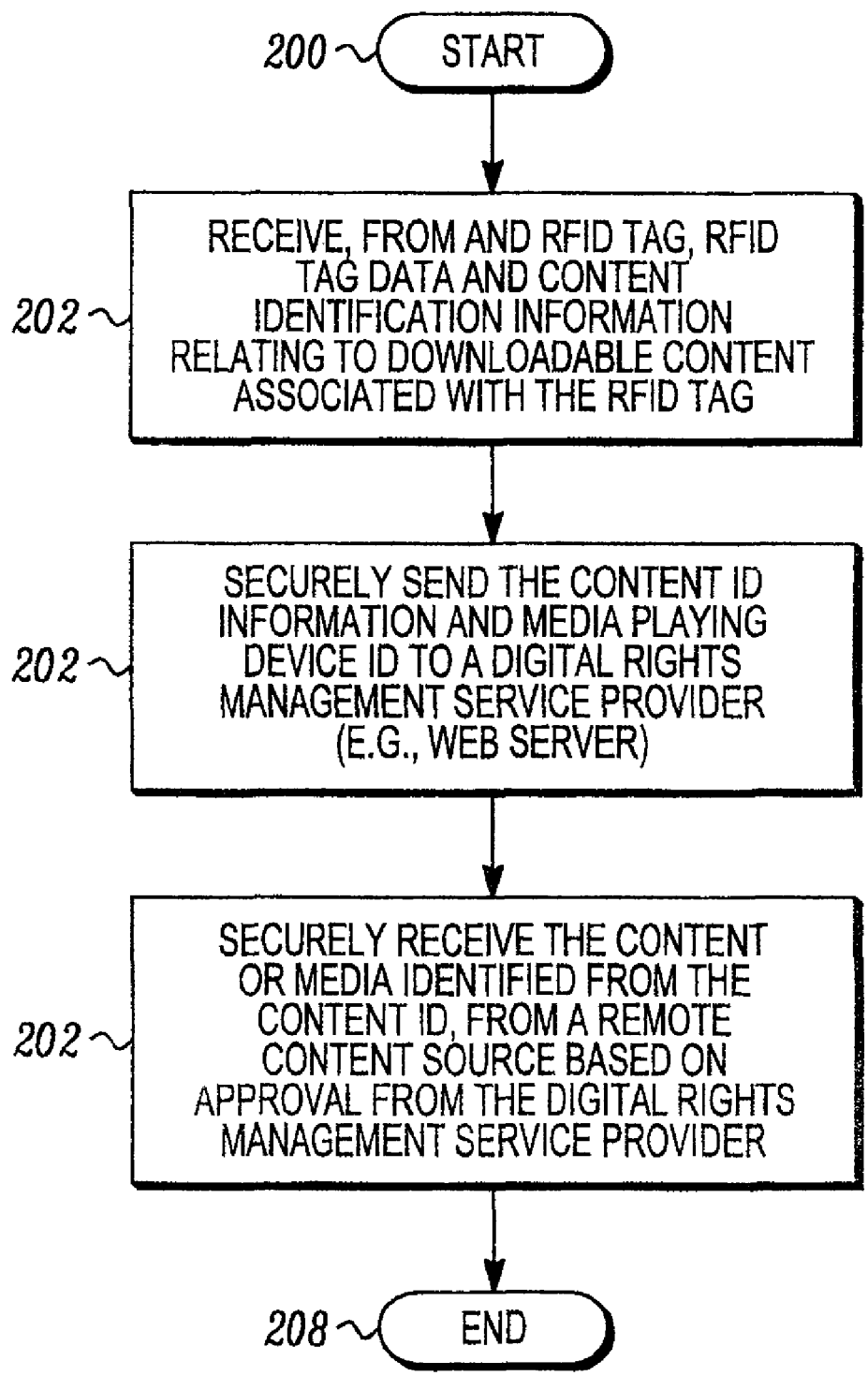
FIG. 2 is a flowchart illustrating one example of a method for securely obtaining content from a content source in accordance with the one embodiment of the invention.

FIG. 2 illustrates one example of a method for securing content from a content source that may be carried out for example by the RFID enabled media player 16 or any other suitable device or devices. As applied, for example to the media playing device 16 of FIG. 1, the method includes sensing that an RFID enabled digital media container 12 is within the suitable proximity of the media playing device as shown in block 200. As shown in block 202, the method includes receiving, from an RFID tag, RFID tag information (e.g. tag ID) and content identification information (e.g. content ID) relating to downloadable content associated with the RFID tag. For example, the RFID reader 18 may read the RFID tag information and pass the information to the controller 20. As shown in block 204, the method includes securely sending the content ID information that is obtained from the RFID tag, to a digital rights management service provider 36 along with media player identification information (e.g., player ID) to the DRM service provider 36. This may be done for example by the controller 20 utilizing a secure channel (e.g. SSL link) through the communication interface 32. As shown in block 206, the method includes receiving, in a secure manner, the desired content from the remote content source that has been identified by the content identification information. This may be done for example by the digital rights management service provider 36 sending in a secure manner (e.g. through an SSL link) media identifiers (e.g. URL's to digital media) that index to encrypted content to be played by the media playing device 16. This is done based on approval from the digital rights management service provider 36.

The digital rights management service provider 36 as described in more detail below, performs an authentication operation which may include for example, comparing the sent media player identification information (player ID) to known valid player ID's to confirm that the media player requesting the media content is a trusted player and hence requesting media on behalf of a trusted RFID enabled digital media container. The method may also include receiving, if desired, data to allow access to an online service other than for example, the requested digital media. The digital rights management service provider 36 may provide URL's back to the media playing device 16 which not only allow downloading of media, but also allow downloading content. Then, through a browser, or other suitable network browsing mechanism, the device 16 connects with the designated web location using the URL to obtain content from the content service provider 38 which may be for example, an artist/song web page. As such receiving media content in the form of audio and/or video media or other online service information is done in response to sending the content identification information for example to the DRM service provider 36, or other suitable digital rights authority. As shown in block 208, the process may then end and wait for another RFID enabled portable digital media container 12 to be placed in suitable proximity to the RFID reader to initiate another download of other media. Where the downloaded content includes content provided by an on-line content service provider, such as access to an artist's web page for example, the controller 20 may activate the browser to display the artist's web page on display 40. At the same time, for example, the encrypted media that has been downloaded and provided by the media content server 24 may be played by the digital audio and/or video media playing subsystem 22.

The method may also include, if desired, as a security process, securely sending media player authentication information (e.g. encrypted player ID), to the digital rights management service provider 36 so that the digital rights management service provider 36 may determine whether an authentic media playing device is requesting access to the encrypted media content. As such several levels of security are provided by the system. Also, the method may include receiving the content in a secure manner from the media content server 24 only if the media playing device 16 is properly authenticated by the DRM service provider 36.

Figure 3:
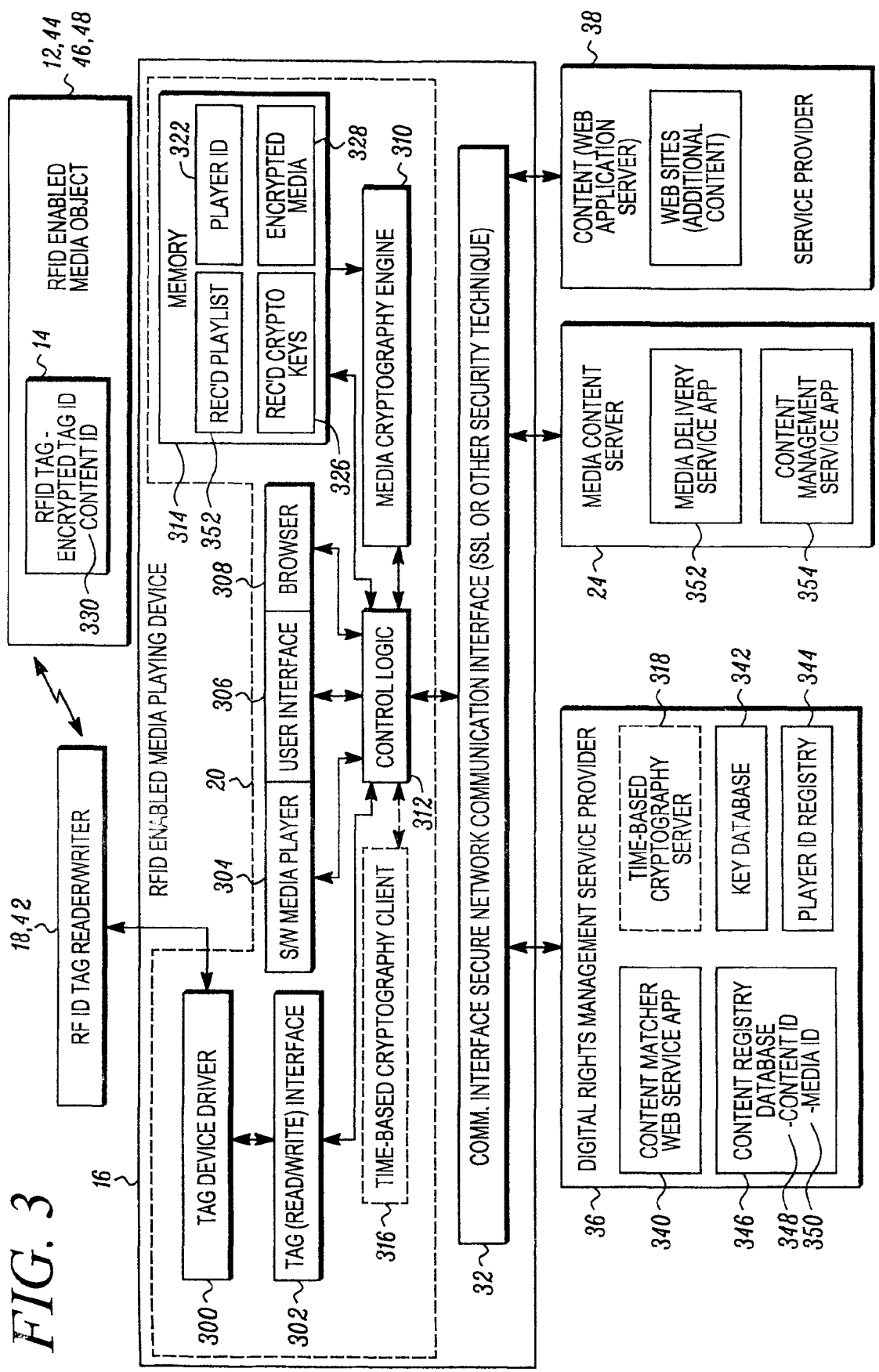
FIG. 3 is a block diagram illustrating one example of a digital media system in accordance with one embodiment of the invention.

FIG. 3 is a block diagram illustrating in more detail an example of a media content delivery system. As shown in this example, the controller 20 includes an RFID tag device driver 300, a tag read/write interface 302, software media player 304, user interface 306, web browser 308, media cryptography engine 310, control logic application 312, and memory 314. The blocks 300 through 312 are preferably software applications in the form of executable instructions that are stored in memory (not shown) such as RAM, ROM, distributed memory or any other suitable memory as known in the art. These software applications are preferably executed by a processing device such as central processing unit, or any suitable processing device or plurality of devices. However it will be recognized that the functionalities described herein may be implemented using discrete logic or any other suitable structures known in the art. Moreover, it will be recognized that various operations may be performed by other devices. However, for purposes of illustration they are shown to be part of the RFID enabled media playing device 16. Also as shown in this example, the RFID tag reader 18 and writer 42 are shown to be external to the RFID enabled media playing device. However, it will be recognized that in a preferred embodiment, the RFID tag reader 18 and writer 42 are co-located within the same housing of the RFID enabled media playing device.

Also if desired, the media playing device 16 may also include a time-based cryptography client application 316 and the digital rights management service provider 36 may likewise include a corresponding time-based cryptography server 318. The time-based cryptography client 316 may, for example, provide another level of security between the digital rights management service provider 36 and the media player device 16, by encrypting content identification information 330 or any other suitable information based on time of day information, such as but not limited to time synchronization based security processes. As used herein, encrypting also includes sending a representation of an ID from which the ID can be constructed from the representation. The time-based cryptography server 318 if employed receives the time based encrypted information and decrypts the information as necessary to determine the content ID, which also provides a level of authentication as known in the art.

The memory 314 includes the playing device identification data (player ID) 322, received playlist data 324 as received from for example the digital rights management service provider 36, received cryptographic keys 326 such as received decryption keys sent by the digital rights management service provider 36, and encrypted media 328 which is the media content obtained based on the content ID 330 in the RFID tag located on the RFID enabled media object. The memory 314 is preferably local for security reasons but may be remote if proper security is provided.

The digital rights management service provider 36 as previously noted may be one or more web accessible servers whose functionality may be distributed if desired or co-located in the media content server 24 or any other suitable location. In this example, the digital rights management service provider 36 includes content matter web service application 340, a decryption key database 342, a player ID registry 344, and a content registry 346 which includes stored content identification information (content ID) 348 which identifies media and/or content to be downloaded and media identification information (media ID) 350. A linked list of media IDs serves as part of a playlist (list of media files to be downloaded) for the media player. The content identification information 348 is linked with media identification information to designate a class, group or type of media/content to be downloaded. The media identification information, also referred to as media ID, includes data representing, for example, media file name, the URL to access the corresponding encrypted media file and a media type which allows, for example, specifying if a media file is a media file or is an online service. As such, the content registry database includes linked content identification information and media identification information. The content identification information may include, for example, content name and data representing a description of the content. The key database may include, for example, the media identification data and its corresponding decryption key such as a triple DES encryption key(s), or any other suitable encryption key(s) and initialization vectors if necessary.

The digital rights management service provider 36, in one example is a suitable server and may include one or more processors and associated memory or any other conventional structure to carry out the operations required by the content matter web service application 340. This application may be executable instructions stored in a memory (not shown) and executed by one or more processing devices of the digital rights management service provider. The media content server 24 includes media delivery service application 352 and content management service application 354. The media delivery service application 352 facilitates the downloading of media for example, in HTTP format or any other suitable format through a suitable communication interface. The content management service application 354 may include a user interface that allows an operator to remove or add media in directories for downloading. For example, the content management service application may allow the deletion or addition of media, whether encrypted or unencrypted, to a suitable directory.

The content service provider 38 may be for example one or more servers that contain website information that are accessible via uniform resource locator information or any other suitable locator information as known in the art. It will also be recognized that the content service provider 38 and other servers may be a plurality of servers since content may be located on a number of different servers and accessible through any number of applications.

The RFID tag reader 18 and writer 42 may be any conventional RFID tag readers and writers. The controller 20 is operative to control the RFID writer 42 to write information, to the RFID tag on the portable digital media container or other object, that is retrieved from the content service provider, media content server or from any other desired source.

The tag device driver 300 is a device driver typically provided by the manufacturer of the RFID tag reader and writer and facilitates communication between the control logic application 312 and the RFID tag reader and writer 18 and 42. For example, the tag device driver 300 effectively listens for when an RFID enabled media object is close enough to allow detection and reading of the RFID tag as known in the art. The tag interface 302 is a type of application interface to allow, for example, the control logic application 312 to communicate with a plurality of different RFID tag readers and writers that are manufactured by different parties. This also provides suitable handshaking and protocols for the tag device driver to enable the tag device driver to communicate properly with the RFID tag reader and writer. The software media player 304 may be for example a Microsoft® media player application or any other suitable media player as desired. The user interface 306 may be for example a graphic user interface that is displayed on a display to allow a user to view output and enter input for the control logic application 312. The user interface may be any suitable interface such as the keypad, touch screen, voice based interface or any other suitable user interface as desired. The browser 308 may be any suitable web browser. The user interface also allows the presentation of icons and the changing of visual effects on a screen and also presents via the display, the playlist and other information as described below. The user interface also provides input to allow the user to communicate in chat rooms or activate other information via the browser.

The control logic application 312 controls all of the necessary components at any given time to communicate with for example the communication interface 32 as well as other applications in order to provide the requisite output as described herein. For example, it may obtain and receive the playlist data 324 and provide it to the user interface 306 for display. The control logic application 312 may also, for example, obtain the stored player ID 322 and send it through an appropriate secure-socket layer communication link to the digital rights management service provider through the communication interface 332.

The media cryptography engine 310 decrypts the encrypted media and/or may encrypt the content ID or any other suitable information for the DRM service provider 36. The media cryptography engine 310 obtains the received decryption keys 326 and uses them to decrypt the encrypted media 328. The media cryptography engine 310 may be any suitable cryptography engine including, but not limited to, a public key based cryptographic engine, symmetric key based cryptographic engine or any suitable cryptographic engine. The playlist 324 is typically sent by the digital rights management service provider and includes the decryption keys. Accordingly, the media cryptography engine 310 extracts the decryption keys from the playlist information. The playlist information also includes the rights that are allowed by the DRM service provider, such as whether the media playing device can store the encrypted media in an unencrypted form, or any other suitable digital rights for media play as known in the art. The playlist information also includes, for example, a URL or a URL's pointing to content as indexed, by for example, the content ID 330.

Figure 4:
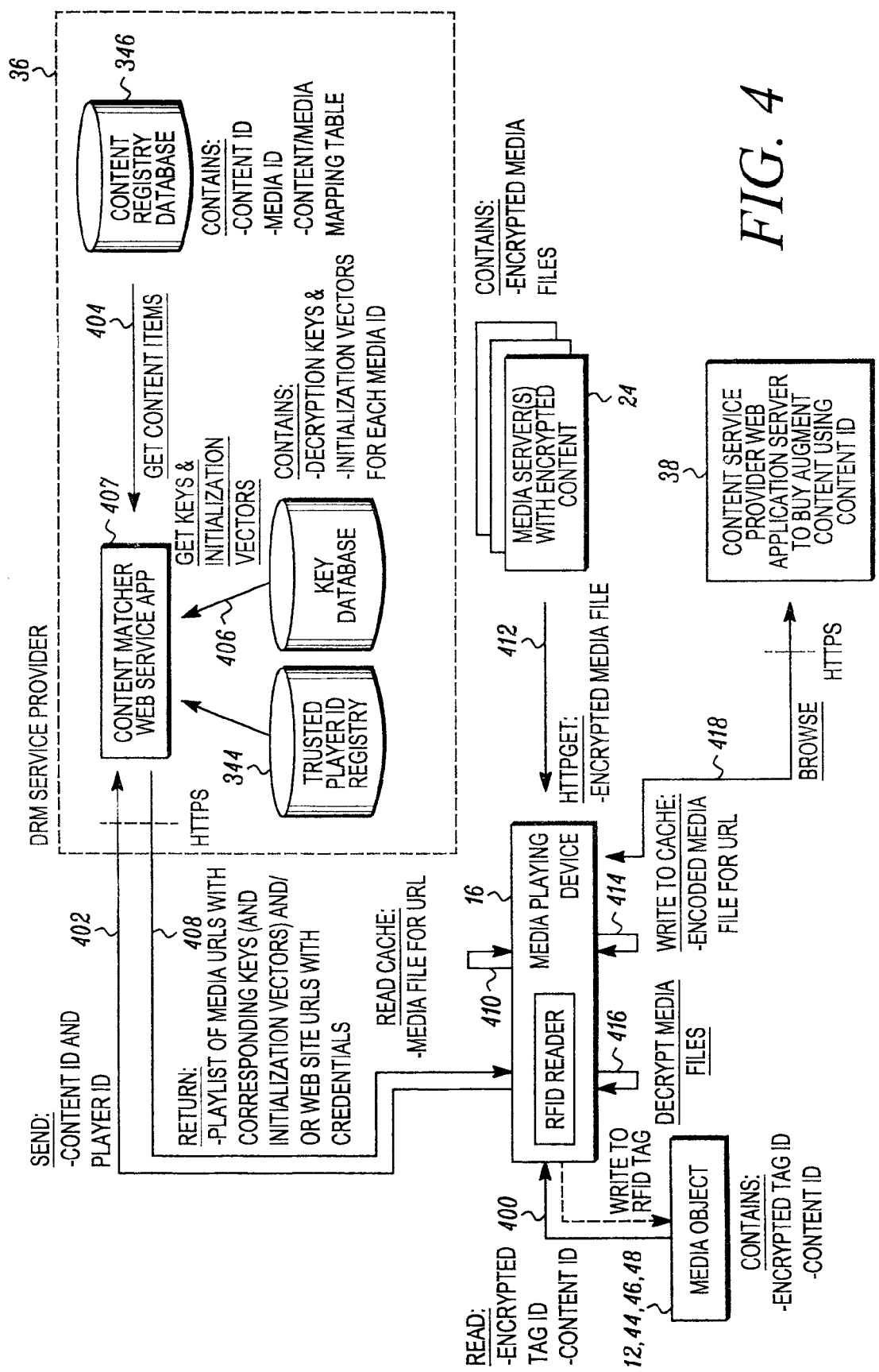
FIG. 4 is a block diagram illustrating various communication sequences in a digital media system in accordance with one embodiment of the invention.
Figure 5:
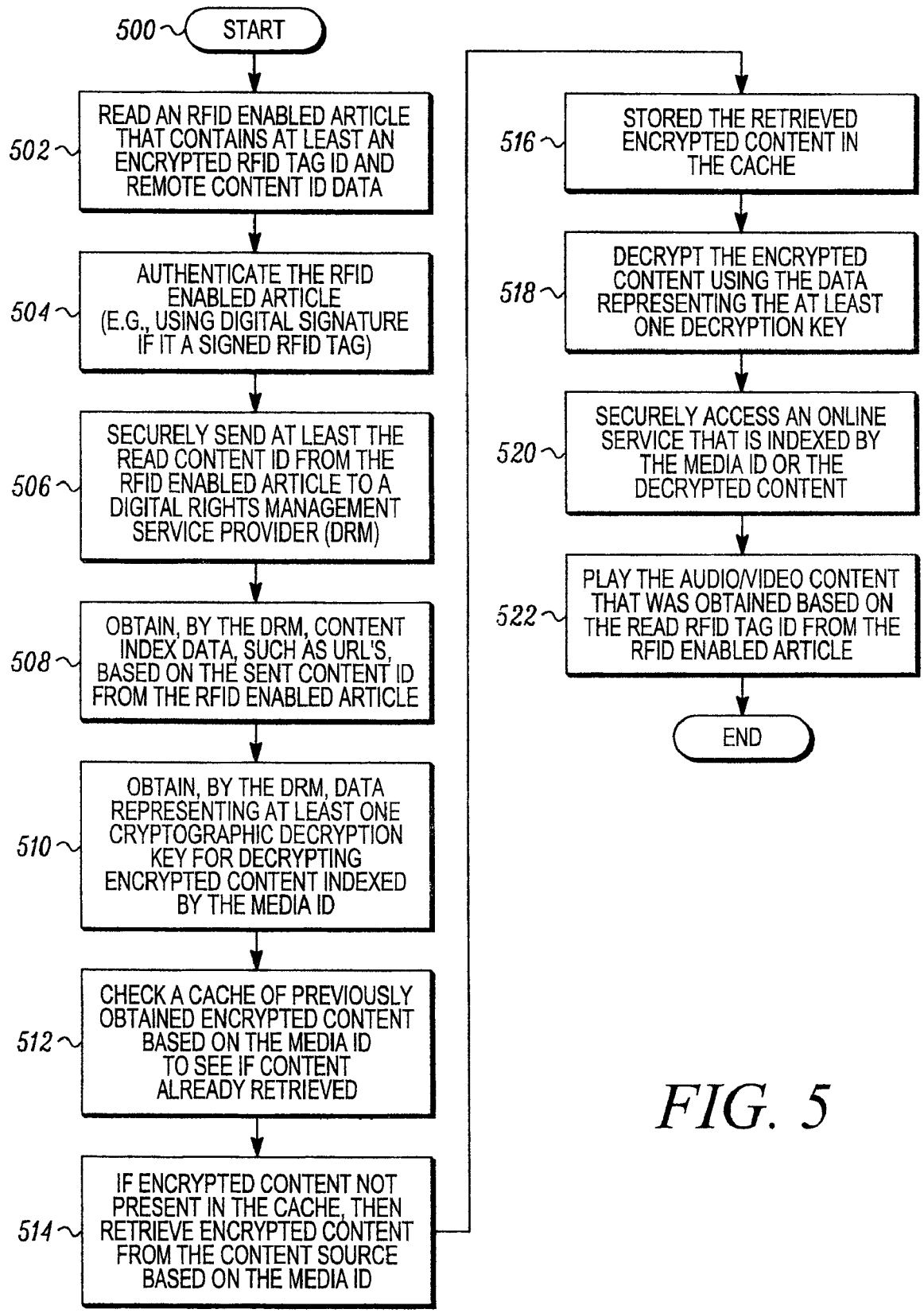
FIG. 5 is a flowchart illustrating one example of a method of securely obtaining content from a content source in accordance with one embodiment to the invention.

Referring to FIGS. 3, 4 and 5, the operation of the system shown in FIG. 3 will be described. The arrows shown in FIG. 4 represent operations or communications between devices. These communications may occur over secure links using known protocols, and by way of example, will be described with reference to HTTP based protocols.

In operation, the media playing device 16 uses the RFID reader to read the encrypted tag identification information and the content ID that is stored in the RFID tag. This is shown for example by communication line 400 (FIG. 4). The operations described with respect to the media playing device 16 are performed for example under the control of the controller and hence control logic application 312. If the RFID tag is trusted, the RFID reader is able to verify the tag ID and read the content ID. Once the media playing device 16 obtains the encrypted tag identification information and content ID from the RFID enabled media object 12, 44, 46 and 48, the media playing device 16 forwards the remote content ID data (content ID) along with its own player ID to the digital rights management service provider 36. This is shown in block 506 and represented by communication 402. As such, in this example the media playing device 16 securely sends, such as through an HTTPS connection, at least the read content ID from the RFID enabled article to the digital rights management service provider. The digital rights management service provider 36 obtains media IDs, such as URL's, from the content registry database 346 based on the content ID. For example, a copy of the content ID is stored in the content registry database that is mapped to one or more media ID's through a mapping table or other structure. This is performed after the DRM service provider 36 authenticates the media playing device 16 by matching the received player ID with a player ID that is stored in the trusted player ID registry 344. However, it will be recognized that any suitable authentication scheme may also be used. As later described, the trusted player ID registry is created by the DRM service provider when the media playing device is manufactured or may be downloaded by the media playing device 16 at a later date if desired. If the received player ID sent by the media playing device 16 matches a player ID in the trusted registry, the content matcher web service application approves the authentication and uses the content ID to obtain the corresponding media ID's from the content registry database as shown for example by communication 404. This is also shown for example in step 508 of FIG. 5.

As mentioned above, the media ID 350 represents for example the URL associated with the media content server 24 containing encrypted content so that the media playing device 16 can subsequently communicate with and obtain the encrypted media files from the media content server 24. The media ID 350 also may include data representing such as the name of a song or movie that the media server 24 uses to organize the media files. The media index 350 is also sent as part of the information sent back to the media playing device 16 so the media content server 24 can find the requested media.

In addition, the DRM service provider 36 obtains data representing at least one cryptographic decryption key which may be for example the decryption key itself or an index to another location to get the decryption key, or it may be for example a hash of the key, or any other suitable representation of the key for the encrypted content that is indexed by the content identification data 348. This information is returned in the form of a playlist of media URLs and media identifiers with corresponding keys and/or website URLs with appropriate credentials to allow the media playing device 16 to access the media content server 24 and for the media content server 24 to retrieve the appropriate encrypted media. This is shown for example by block 510 and communication line 406. The content registry database 346, in this example, also includes a content/media mapping table which for example may link specific content that is provided by a web application server 38 with encrypted media files so that when the encrypted media file is requested, additional information from the content service provider 38 relating to the encrypted media is also sent to the media playing device 16 to allow the device 16 to not only obtain encrypted media but also automatically access another web site that may simultaneously retrieve online content which is not encrypted. The key database 342 is preferably linked with a content registry database 346 such that when the content ID is received, the content registry database 346 can also point to the appropriate decryption key for that given content. The DRM service provider 36 then securely sends the playlist for the media playing device 16. This is shown for example by communication 408.

If the media playing device 16 includes a cache of previously obtained media files, the method includes checking the cache of previously obtained encrypted content using the received media ID from the playlist to see if the newly received content was retrieved during a previous session. This is shown by line 410 and is represented by block 512. However, if no cache is used, this step may be avoided. However, if a cache is used and if the encrypted content is not present in the cache, the playing device retrieves encrypted content from the media content source, such as the media content server 24 using the media ID (namely the URL provided by the DRM service provider). This is shown by communication line 412 and is indicated by block 514. Hence, the encrypted media information, such as the encrypted video and/or audio information that can be played by the media playing device is obtained.

If the cache is used, then the retrieved encrypted content is stored in the cache as shown for example in block 516. This is also shown for example by line 414. As shown in block 518, the method includes decrypting, such as by the media cryptography engine 310, the encrypted media using the data representing at least one cryptographic decryption key so that the media player 404 can play the decrypted media file. This is shown for example by line 416. If the DRM service provider 36 in addition to sending the URL for the encrypted media also sent for example a URL for additional content provided by the content service provider 38, the method includes securely accessing an on-line service that is indexed by the media ID or that may be indexed by the decrypted media file if another media ID is present in the encrypted media file. This is shown in block 520. This is also represented by communication 418. As shown in block 520, the method includes playing the decrypted content that was obtained based on the RFID tag identification from the RFID enabled article by the media player 304. The media content playing device 16 commences playing of retrieved additional information associated with the RFID tag information, such as digital audio and/or video media content, in response to the retrieval of that information. It also will be recognized that no caching would be necessary if the decryption operation was quick enough to allow immediate playback. For example, broadband communication links may remove the need for caching.

The media playing device 16 may utilize the RFID tag writer to store information back onto the audio video media object. For example, the media ID's corresponding to content or media that a user purchased a content service provider 38 or media server may be written back to the object. This transfers already acquired digital rights for media/content that has already been bought online in order to allow replay in any other trusted media playing device.

In an alternative embodiment, the media playing device 16 may read the RFID enabled media object 12 to obtain authentication information that is stored in the RFID tag. This authentication information may be any suitable authentication information such as key or digital signature or other information. In the case of a digital signature, the signature may be generated using a signing certificate of the DRM service provider or other suitable trusted authority or any other suitable information. The media playing device 16, through the media cryptography engine 310, performs authentication based on the authentication information obtained from the RFID enabled media object. This may include for example performing digital signature verification by the media playing device or other suitable authentication process as known in the art. This is shown for example in blocks 502 and 504 of FIG. 5.

In summary, when one or more media objects are in range, the media playing device 16 reads the ID tag from the media object to obtain the tag identification information and the content identification information (content ID). The media playing device then connects to the DRM service provider 36 via a secure web service to request the corresponding media and digital rights that are identified by the content ID. The player ID is also submitted prior to this for verification. Within the DRM service provider 36, the content matcher web service application 407 accesses the content registry database to get the list of content items corresponding to the received content ID. Content items can be media, such as music or video or online services such as website services that do not require the download of encrypted information. The content matcher web service application then accesses the key database to get decryption keys and initialization vectors for the corresponding media items that are indexed with the content ID. A data structure referred to as the playlist, is an aggregate of media ID(s) with corresponding keys and initialization vectors. The playlist is returned to the media playing device. The media playing device then decrypts retrieved encrypted media files that were identified by the media URLs in the playlist and decrypts the information and plays the media back.

Figure 6:
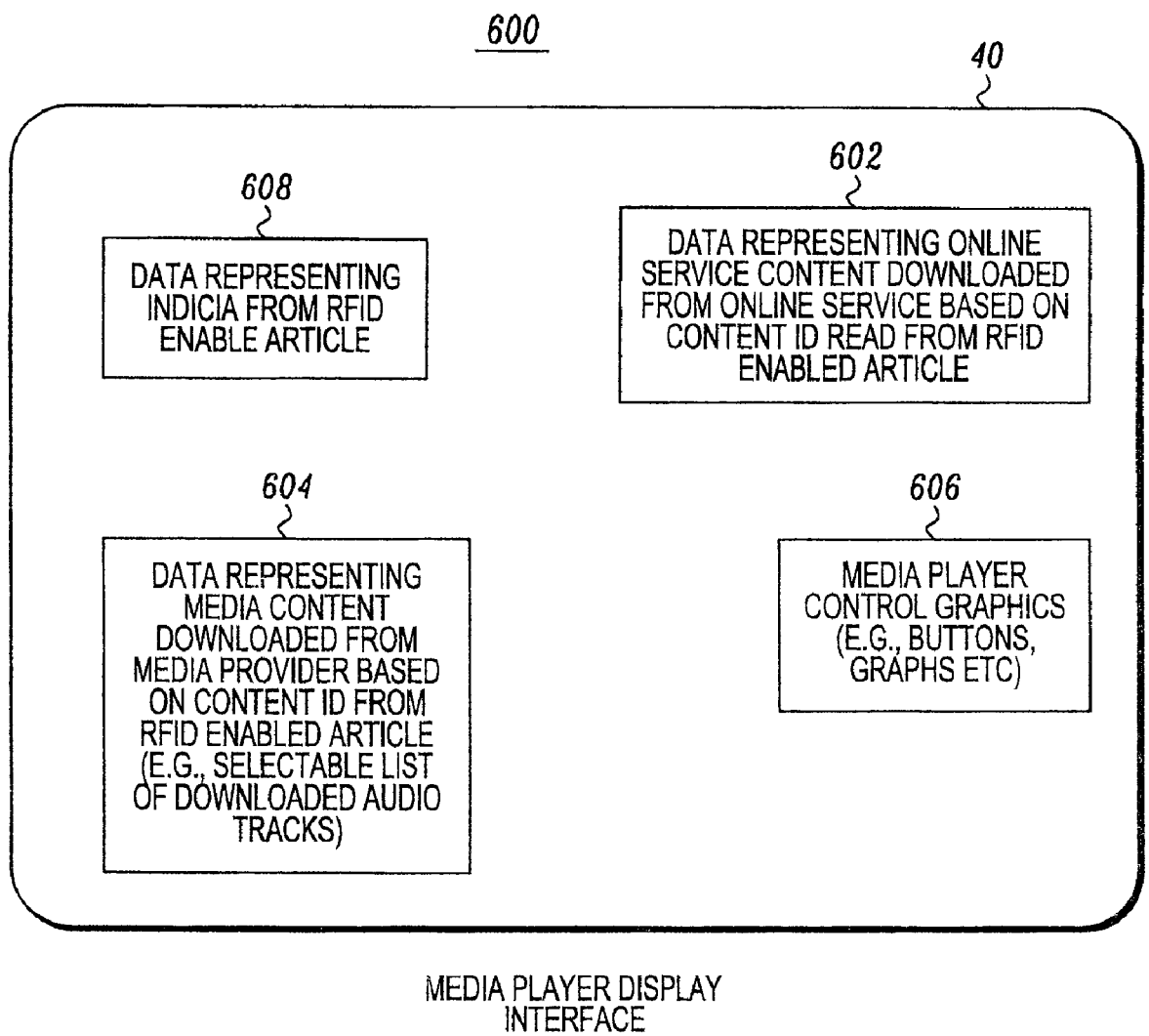
FIG. 6 is a block diagram illustrating one example of a media player display interface in accordance with one embodiment of the invention.

FIG. 6 illustrates one example of a media player display interface 600 displayed for example on the display 40 (FIG. 1) as the user interface. As shown, the media player display interface 600 may provide graphics and/or text and includes data representing on-line service content 602, such as the web page of content downloaded from an on-line content service provider (e.g., server) based on content identification information (i.e., content ID) obtained from the RFID tag on the portable media container or media object. In this example, the content identification information provides an indirect link to the content service provider since in the example provided above, the DRM service provider 36 maps content to be downloaded from the content service provider 38 through media ID(s) which is based on the content identification information stored in the RFID tag. The media player display interface also presents data representing media content 604 that was encrypted and downloaded from the media content server 24 based on the content identification from the RFID enabled article such as the portable media container or other object. The media content indicated above is securely downloaded from the remote media content server 24 (media source) either by virtue of the fact that media itself is encrypted or that the information is communicated through a secured channel such as through an SSL link or any other suitable protected channel.

The media player display interface 600 also includes data representing media player control graphics 606 for providing media player control to control play of the media content downloaded from the remote media source. For example, the media player control graphics 606 may be graphics buttons that are displayed representing fast forward, stop, play, volume control or any other suitable controls to control the digital audio and/or video media playing subsystem 22. In addition, if desired, the media player user interface presents data representing indicia from the RFID enabled article 608 which may be found for example in the embodiment where the article is a movie card. The data representing indicia from the RFID enabled article may be the content indicia 50 (which includes a representation thereof), or information that is related to it. Too, for example, the displayed data 608 indicates to the user that they have obtained the proper downloaded media content. As such, a visual indication allows the user to readily identify whether an error has occurred if the content of the downloaded media that is shown by for example the data 608 matches for example information or other visual indicia on the movie card. As such, the media player user interface includes data 608 that represents visual indicia located on the RFID tag that's on a portable media object.

Figure 7:
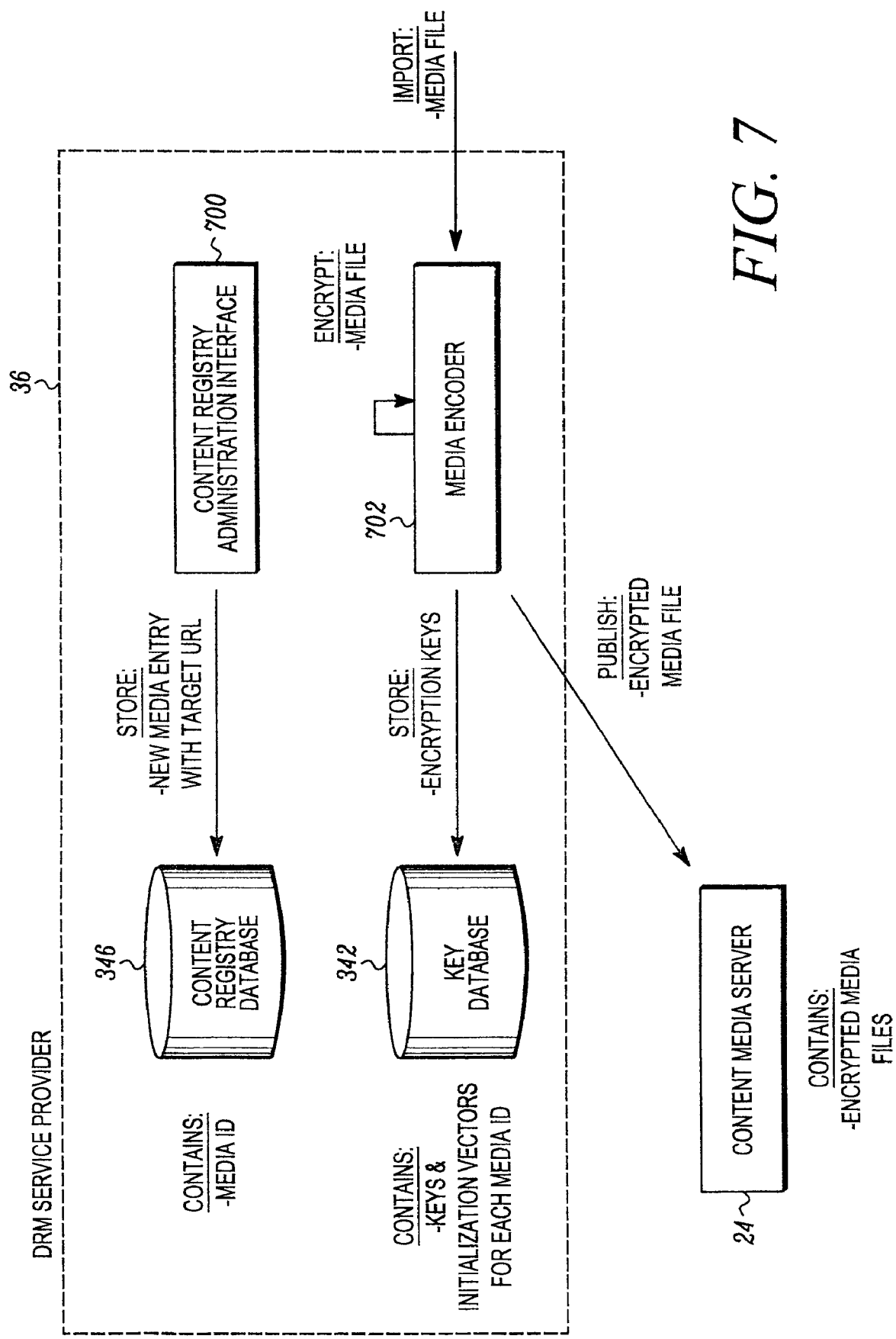
FIG. 7 is a block diagram illustrating one example of a digital rights management service provider in accordance with one embodiment of the invention.

FIG. 7 illustrates a block diagram of the digital rights management service provider 36 which is a trusted authority, and therefore by way of example, may issue and/or sign digital certificates, or provide other suitable trust information as known for example in the public key/private key and symmetric key cryptography fields. The DRM service provider 36 may serve as the digital audio and/or video media encoder as shown in this example. As such, in this example, the content registry database 346 is populated with media identification information 350 and the key database 342 is populated with appropriate decryption keys for given media content and initialization vectors for each media identifier since one media server may store multiple media files and each media file may have a separate media identification or identifier. Also media may be downloaded from multiple media content servers. The DRM service provider 36 also includes a content registry administration interface 700 that may be, for example, a graphic user interface to allow an administrator to link database entries of target URL's with the corresponding media identifier.

In operation, an operator may enter a media name and an associated target URL of where this information is stored for entry in the content registry database 346 as media identification information. A media encoder 702 suitably encodes (encrypts) an imported media file from a suitable media file source and produces encrypted media content which is then stored in the media content server 24. Any suitable encryption technique may be used such as triple DES or any other suitable encryption scheme. The DRM may publish the encrypted media a directory or other suitable storage location. The corresponding decryption keys are then stored in the key database 342 and indexed with the appropriate media identification information so that the appropriate decryption key is linked to the corresponding encrypted media.

In summary, media is effectively packaged by encrypting and registering the resulting media file with a unique media identifier. The media identifier contains the target URL of the media file. The selection of the media may be performed through a suitable content registry administration interface. The encrypted media files may be published to a media service provider and randomly generated initialization vectors and decryption keys are stored in the DRM service provider database.

Figure 8:
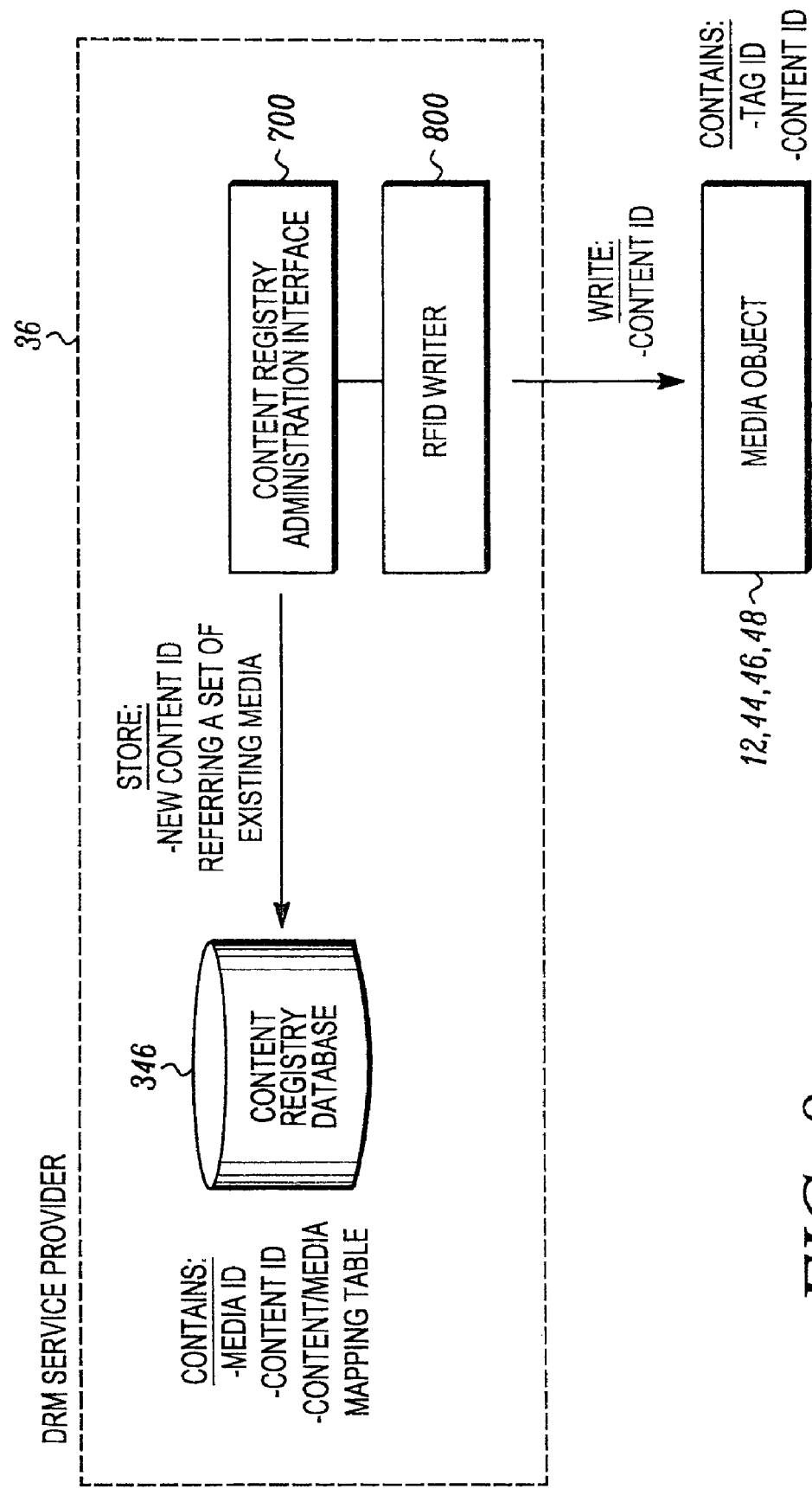
FIG. 8 is a block diagram illustrating one example of a digital rights management service provider in accordance with one embodiment of the invention.

FIG. 8 illustrates a block diagram of the DRM service provider 36 operating in a mode to create a digital audio and/or video media object. In this example, the digital rights management service provider 36 creates a link between content identification information (i.e., content ID) or otherwise referred to as remote content identification data with one or more media identifiers to create, for example, the playlist which may include a group of songs that may be linked to a single content identifier. As such a content registry administration interface (e.g., GUI) is used to allow an operator to create and link product offerings of digital audio and/or media information for a specific media object or group of media objects. As such, the new content identifier is created and linked with the media identifier and a content media mapping table entry linking the information is stored in the content registry database 346. The DRM service provider 36 also includes a RFID writer 800 to write the content identification on the media object 12, 44, 46 and 48. In addition, the DRM service provider 36 also writes the encrypted tag identifier on the media object as the trusted authority. In addition if desired, the media object authentication information may also be written to the RFID tag on the media object.

New or updated content identification information is created, for example, in the content registry database using the administration interface. The content identification information is linked to a modifiable set of media ID's that represent a plurality of songs or albums. Content identification information is linked with the media IDs to create new content identification information to obtain a selectable set of media elements that are encrypted. The content ID is then written to the RFID tag. The content ID may be written to the RFID tag by the DRM service provider, or may be communicated to a third party or the media playing device in the event the RFID tag and hence media object is to be populated with a new content ID. Accordingly, RFID tag writer of the media playing device may be used to create new media objects by updating them with new content identifiers.

As described above, the media player is responsible for reading and writing to RFID tags of a media object, securely connecting and authenticating to the DRM service provider, downloading encrypted media from a suitable media source, decrypting media and playing media. In addition, it may also include a browser to provide access to online services to facilitate buying content online or chat room exchanges or any other suitable web based interactions as known in the art.

The digital rights management service provider is responsible for centrally and securely managing media identifiers (media ID), content identification information (content ID) and keys to encrypted media. The digital rights management service provider provides a secure web service front end that is accessed by the media playing device to retrieve digital rights and pointers to media files and online services. It also provides administration tools that enable media management such as the encryption and publication of media files as well as content management such as the creation and control of content on the media objects.

It will be recognized that control information may also be embedded in the information sent back by the digital rights management service provider. For example, the order in which the media identification information is sent back may be dictate for example, the order in which the media playing device plays downloaded songs. Alternatively, control information such as any suitable data, may be embedded in the communication which is then interpreted by the controller of the media playing device to play content in a certain order or for a certain length of time, or a certain time of day, or based on any other suitable criteria.

In addition, it will be recognized that the media content and other content as well as the RFID enabled objects may be provided on a subscription basis so that the digital rights management service provider for example, or other suitable network element keeps track of which users are actual subscribers, which users have paid for downloadable content and this information may be written back for example, to the RFID object to provide an ongoing account balance. Other subscription information, such as a subscription account number or other information may be written back to the RFID tag. Any other suitable subscription based operations and functions may also be implemented as known in the art.

Figure 9:
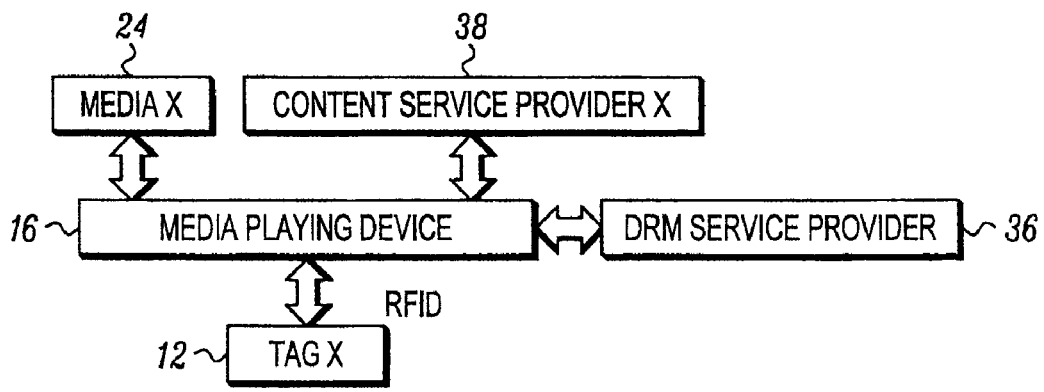
FIG. 9 is a block diagram illustrating one example of a digital media or content system in accordance with one embodiment of the invention.
Figure 10:
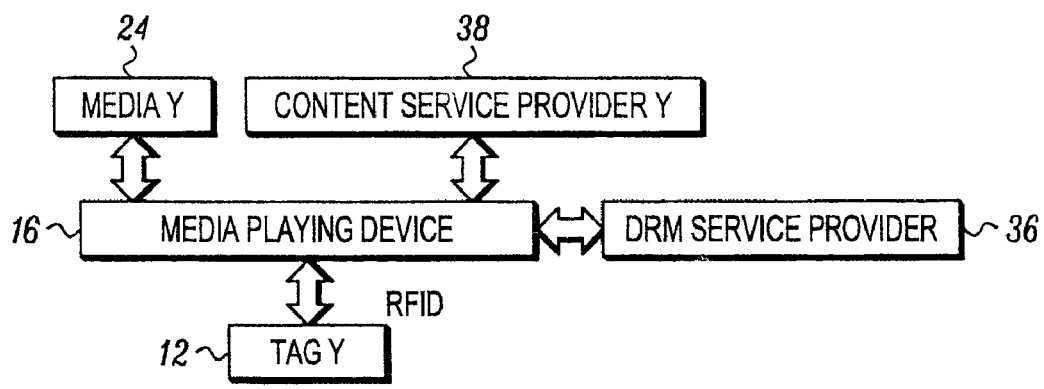
FIG. 10 is a block diagram illustrating one example of a digital media or content system in accordance with one embodiment of the invention.
Figure 11:
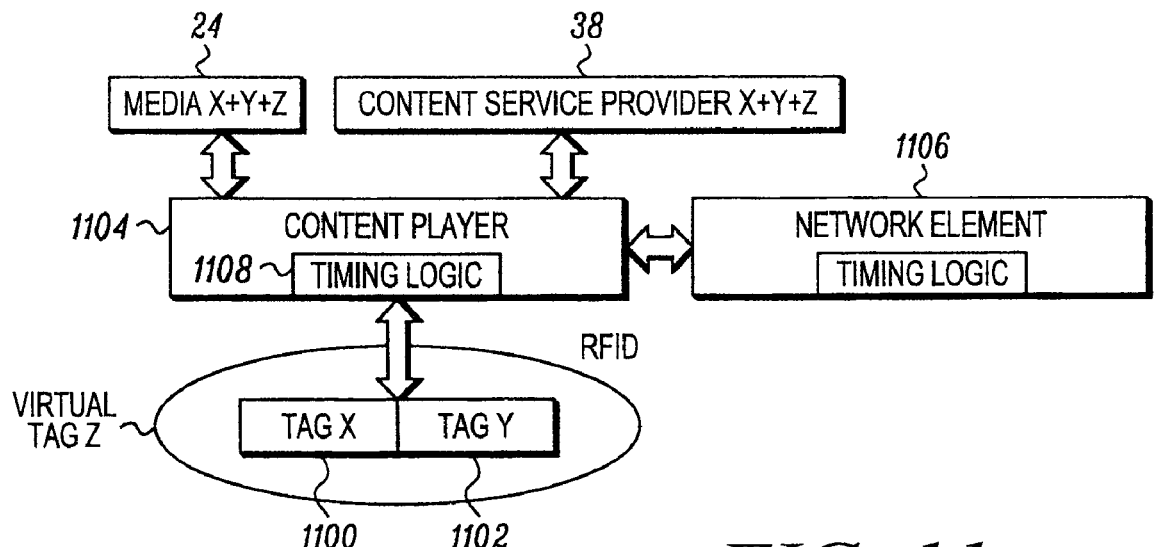
FIG. 11 is a block diagram illustrating one example of a digital media or content system that utilizes a combination of RFID enabled objects in accordance with one embodiment of the invention.

According to FIGS. 9 and 10, digital media systems as described above are shown wherein a media object 12 is read by the RFID reader in the media playing device 16 and the appropriate media is retrieved from the media server 24 or other content from online service provider 38. As shown in FIG. 10 a different media object with a different tag ID and content ID is read by the media playing device 16 and similarly as described above with respect to FIG. 9, the appropriate media and/or content is retrieved by the media playing device. FIG. 11 is a block diagram illustrating a system that employs a combination of RFID enabled objects 1100 and 1102 to obtain additional media and/or content that was not obtainable by using the RFID enabled objects 1100 and 1102 alone or separately. In this example, the RFID enabled object need not be a media object and, the media playing device also need not be capable of playing media and therefore it is shown as being a content playing device 1104. However, it will be recognized that the system shown in FIG. 11 may also be implemented using the previous described media playing device 16, or any other suitable content playing device. For similar reasons, the network element 1106 need not be a digital rights management service provider since content alone may be provided in this embodiment.

The combination of RFID enabled objects may be combined for reading by the RFID reader in a spatial manner or temporal manner. To select or obtain additional content due to a combination of spatially provided RFID enabled objects, the user may simply pass the combination of RFID enabled objects within a readable spatial proximity (e.g., readable range) of the RFID reader and the RFID reader passes the read content IDs to the network element. Alternatively, the user may select a mutual spatial arrangement for each of the respective objects with respect to the RFID reader and each other such that one may RFID object may be closer to the reader than the other and the RFID reader detects the mutual spatial arrangement of the RFID enabled objects. This may done by for example controlling the reading range of the RFID reader to allow the RFID reader to see whether it detects one or both at the same reading range. Other method of determining spatial arrangement may also be used. Once a spatial arrangement is detected, the content playing device sends the combination of content IDs read from the combination of RFID enabled objects and the network element provides access to different digital media content as further set forth below. As such a two-dimensional or three dimensional arrangement of RFID enabled objects is detected and based on the arrangement, different bonus content is provided. Temporal or sequential reading of RFID enabled objects may also be used such that the reading order of the combination of RFID objects determines which bonus content or media is to be downloaded. The combination of RFID enabled objects may be used to identify the shape of the combined objects based on, for example, a detected range of given objects with respect to the RFID reader.

For purposes of illustration, the above embodiment will be described as a digital rights management system although any suitable network element, such as any suitable server, may be used. The structure of the network element may be similar to that described above with respect to the DRM system in that it may contain one or more processing devices or discrete logic or any suitable combination of hardware, software and firmware to carry out the operations described herein. In one example, the network element includes a controller such as a suitably programmed microprocessor and a communication interface, such as any suitable web interface, whether it be wireless or non-wireless, or any other suitable network interface to communicate information to one or more networked devices or systems. However, in contrast to previous embodiments, in this embodiment the network element 1106 is operative to use a plurality of RFID tag information from first and second RFID enabled objects to determine whether a proper combination of RFID enabled objects have been presented to an RF reading device such as that located in the content playing device or other suitable device. This may be performed, for example, by the controller (shown in FIG. 12). The communication interface (C.I.) receives the HTTPS communication through any suitable communication link, or any suitable protocols described above. The RFID tag information from a plurality of RFID tag enabled objects, such as RFID enabled objects may identify only content to be downloaded, or media to be downloaded as described above, or any suitable combination thereof.

As shown in FIG. 11, the RFID reader of the content media player 1104 reads both RFID enabled objects 1100 and 1102 and the content media player 1104 passes this information to the network element 1106. For example, if the combination of read content identifiers matches an expected combination of content identifiers (whether an expected spatial relationship among objects or an expected temporal relationship is detected), the network element authorizes access to content or media that are different from, or in addition to, media or content that would have been authorized if each of the RFID enabled objects were presented individually to the content player 1104. To help insure that combinations of objects are presented with a short period of time (as opposed to hours or days for example), as is also shown, timing logic 1108 may be introduced in the content media player 1104 as part of, for example, the RFID reader control, to determine whether the RFID reader read the tag information from the RFID tags on the different objects within an allowable period of time which may be any suitable predetermined period of time as desired.

The timing logic may alternatively be placed in the network element. For example, the timing logic may be used to determine whether the objects were placed in front of the RFID reader within a short period of time of one another, such as nearly simultaneously. It will also be recognized that more than one reader may be used so that they may communicate with one another allowing the time information to indicate whether multiple RFID enabled object reading have occurred. This operation may alternatively be queued up at network element 1106. For example, content IDs that are received from the same content media player within a suitably short time period, such as, by determining whether the player ID communicated by the content media player is the same for a plurality of different received content ID's are deemed a proper combination. The network element determines that the particular content media player has read a plurality of RFID enabled objects so that the combination of the content IDs should be considered to be a type of virtual tag resulting in additional content being provided to the content media player.

Figure 12:
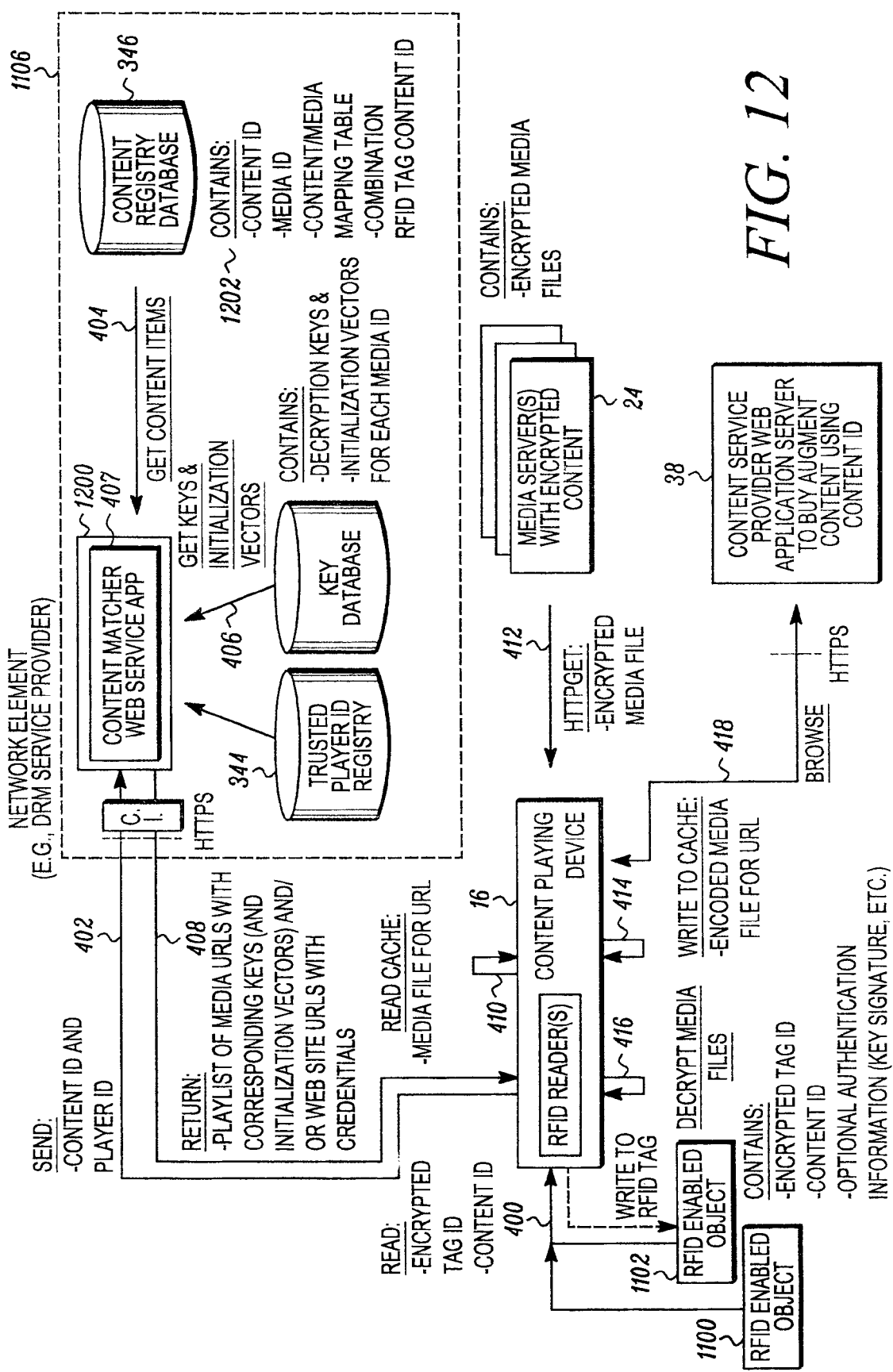
FIG. 12 is a block diagram showing in more detail the system shown in FIG. 11.

FIG. 12 illustrates in more detail the system shown in FIG. 11 and illustrates, for example, the controller 1200 which, among other things, determines whether a proper combination of RFID enabled objects have been presented to an RFID reading device of the content playing device 1104 or any other suitable device that employs an RFID reader.

To provide bonus content or media based on a combination of RFID enabled tags (hence objects), in one example, the content registry database 346 is programmed by an operator to include combination RFID tag content identification information 1202 which identifies new content or media that is downloadable in view of the particular combination of read RFID tags. In one embodiment the network element 1106, through a suitable communication interface, receives a plurality of content IDs that when received in combination, for example, within a specified period of time with respect to one another, are deemed to be a suitable combination that grants additional access to content or media as defined by the combination RFID tag content identification information stored in the content registry database.

As previously mentioned, the controller 1200 may include timing logic that determines whether a plurality of RFID tag information from a plurality of RFID tag enabled objects are a proper combination of RFID tags. For example whether they were received from the RFID reader within an acceptable period of time with respect to one another, such as if the objects are presented at the same time to the RFID reader or in a fast enough sequence to be accepted as a combination of objects. The controller 1200, as noted above with previous embodiments, receives a content playing device identifier or, in the case where a content playing device is not used, the RFID reader may send RFID reader identification information when it sends the read RFID tag enabled object tag identification information. The controller determines whether the RFID tag information was read by an appropriate RFID tag reader. This provides a level of authentication but on a RFID reader level as opposed to a content playing device level or media playing device level.

As noted above, the controller 1200 may include all of the other functionality necessary to carry out the operations described in previous embodiments and hence may provide the digital rights management so that when the RFID enabled object includes content identification information from the content playing unit, the content playing unit can access particular media or content based on whether the RFID tag information from both of the RFID tag enabled objects were received in a particular order. For example, in this embodiment, the sequence that the RFID enabled objects are read may determine which content is authorized or which media is authorized for download. As such, not only can the system alter the downloadable media based on whether a combination of RFID enabled objects are read, but also can alter the downloadable content based on the order in which the RFID enabled objects are read.

In this embodiment the content registry database 346 stores data representing combination RFID tag content identification information 1202 that identifies at least one of downloadable digital content or media that is downloadable, corresponding to an expected combination of RFID enabled objects. The combination RFID tag content identification information 1202 identifies downloadable content or media that is different from stored content identification information that is associated with each of the RFID tag information individually. As such, if one RFID enabled object is to be used to download movie A and another object is used to download movie B, when the two RFID enabled objects are presented to a reader, the network element in response to receiving the combination of content IDs read from the RFID tags, may provide not only the movies identified by the content IDs, but may in addition provide additional content not available by either of the RFID enabled objects alone. As such, the combination RFID tag content ID 1202 indexes additional content and, for example, a plurality of content IDs so that if a plurality of content IDs are detected by the network element, for example, then it can search the database for those two content IDs and if there is an associated combination RFID tag content ID, the index points to additional media or content ID and that information is then provided (URL, etc. described above) so that additional media or content can be downloaded.

Figure 14:
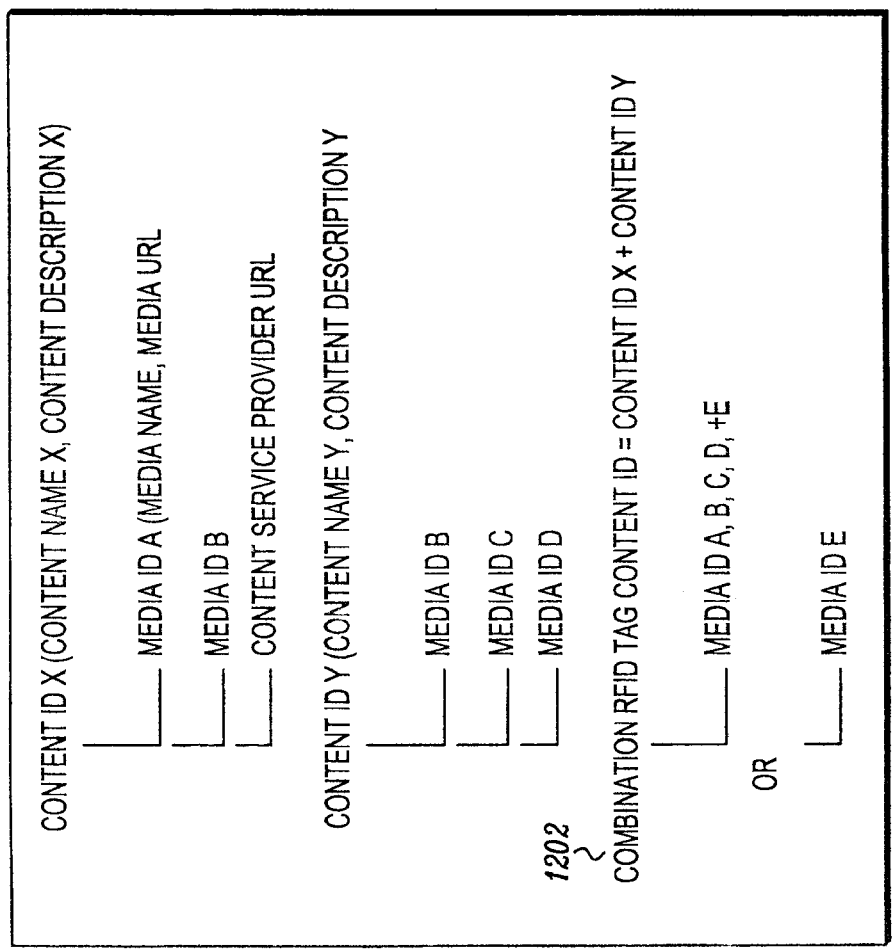
FIG. 14 is a diagrammatic illustration of one example of a content registry database in accordance with one embodiment of the invention.
Figure 13:
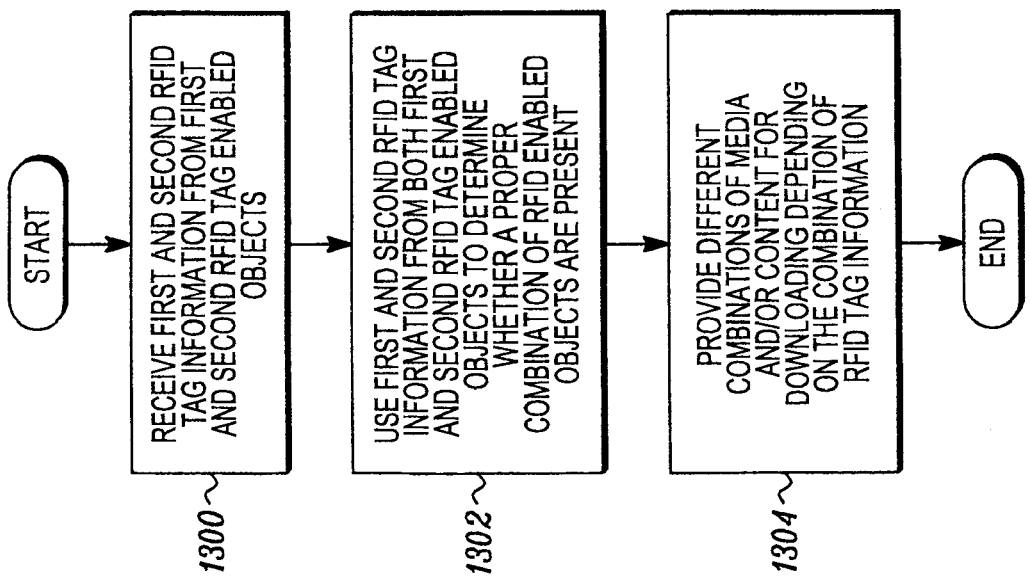
FIG. 13 is a flow chart illustrating one example of a method for obtaining at least one of digital media content and content from at least one content source.

Referring to FIGS. 13 and 14, a method for obtaining either or both digital media content and content from at least one content source using a combination of RFID enabled objects will be described. As shown in block 1300 the method includes receiving, such as by the network element through the communication interface, a plurality of tag information received from a plurality of different RFID tag enabled objects. As shown in block 1302, the method includes using the plurality of RFID tag information obtained from the RFID tags from at least the first and second RFID tag enabled objects, to determine whether a proper combination of RFID enabled objects are present at the RFID reader or content playing device. If a proper combination is detected, the network element, for example, provides access to additional downloadable content or media that is different from allowable or downloadable media or content allowed for each of the RFID enabled objects individually by sending a playlist that identify the additional media or content. This is shown in block 1304.

The method may include, for example, comparing the received RFID tag information within an expected combination of desired RFID tag information and then allowing access to specific content when the combination of the RFID tag information matches the expected combination of desired RFID tag information. In addition, as mentioned above, the method may include taking into account the particular order in which RFID tag enabled objects are read, for example, by an RFID reader. As such, the method may include providing access to particular media or content based on whether the plurality of RFID tag information from both the RFID tag enabled objects are received in a particular order (such as a logical order).

In one embodiment, the content identifiers obtained from the RFID tags are used as a mechanism for determining whether a suitable combination of RFID enabled tags and hence RFID enabled objects are being read by the RFID reader and/or media playing device or content playing device. As such, the network element receives data representing a plurality of content identifiers from the plurality of different RFID tags associated with a plurality of RFID enabled media objects and provides different combinations of media or content for downloading, depending upon the combination of different received content identifiers.

From the content playing device perspective or media playing device perspective, a method for obtaining digital media content and/or content that is downloadable includes contactlessly reading a plurality of RFID tags associated with a plurality of RFID enabled objects to obtain the plurality of RFID tag information from those objects. The method also includes determining whether each of the read plurality of RFID tag information has been read within a suitable period of time with respect to each other and if so, sending the read plurality of RFID tag information for receipt by a content delivery authorization unit, such as the network element which may be, for example, a DRM service provider or any other suitable network element. The network element then determines if downloadable content is available for download based on the specific combination of read RFID tag information sent by the RFID reader or content playing device if it contains the RFID reader.

FIG. 14 illustrates, diagrammatically, one example of the combination RFID tag content ID 1202 as contained, for example, in the content registry database 346. As shown, the content registry database as previously described may include content IDs which then index media IDs for downloadable media and the media IDs may include, for example, the media name, a media URL, and other information. Content service provider URLs may also be indexed to a content ID. As shown in this particular example, content ID X is shown to link media ID A and media ID B whereas content ID Y links media ID B, media ID C and media ID D. The combination RFID tag content ID 1202 that corresponds to a particular combination of content ID X plus content ID Y also indexes to additional media E. As such, when RFID enabled objects X and Y containing content ID X and content ID Y on the RFID tags, are read, the network element searches the content registry database to determine if the content ID X and content ID Y have been linked to one another as a valid combination by searching, for example, the combination RFID tag content IDs. If the content IDs from the read RFID enabled objects match those corresponding to a stored combination RFID tag content ID, then the combination is deemed to be appropriate and the combination RFID tag content ID is sent back, for example, to the media player or content player in the form of a playlist, or other structure that identifies media IDs for media A, B, C, D and E or, alternatively, just the bonus content identified by the media ID E.

As such, among other advantages, placing a combination of RFID enabled objects in proximity to an RFID reader will allow the approval for downloading of additional (e.g. bonus) content or media not otherwise available when each RFID enabled object is presented separately. In addition, the bonus content or services can be changed over time by changing the media IDs associated with a given combination RFID tag content ID. This may be done, for example, by updating the content registry database as desired, such as through the administrator application or other suitable interface. As such, downloadable content can be changed dynamically through the DRM service provider or network element.

Figure 15:
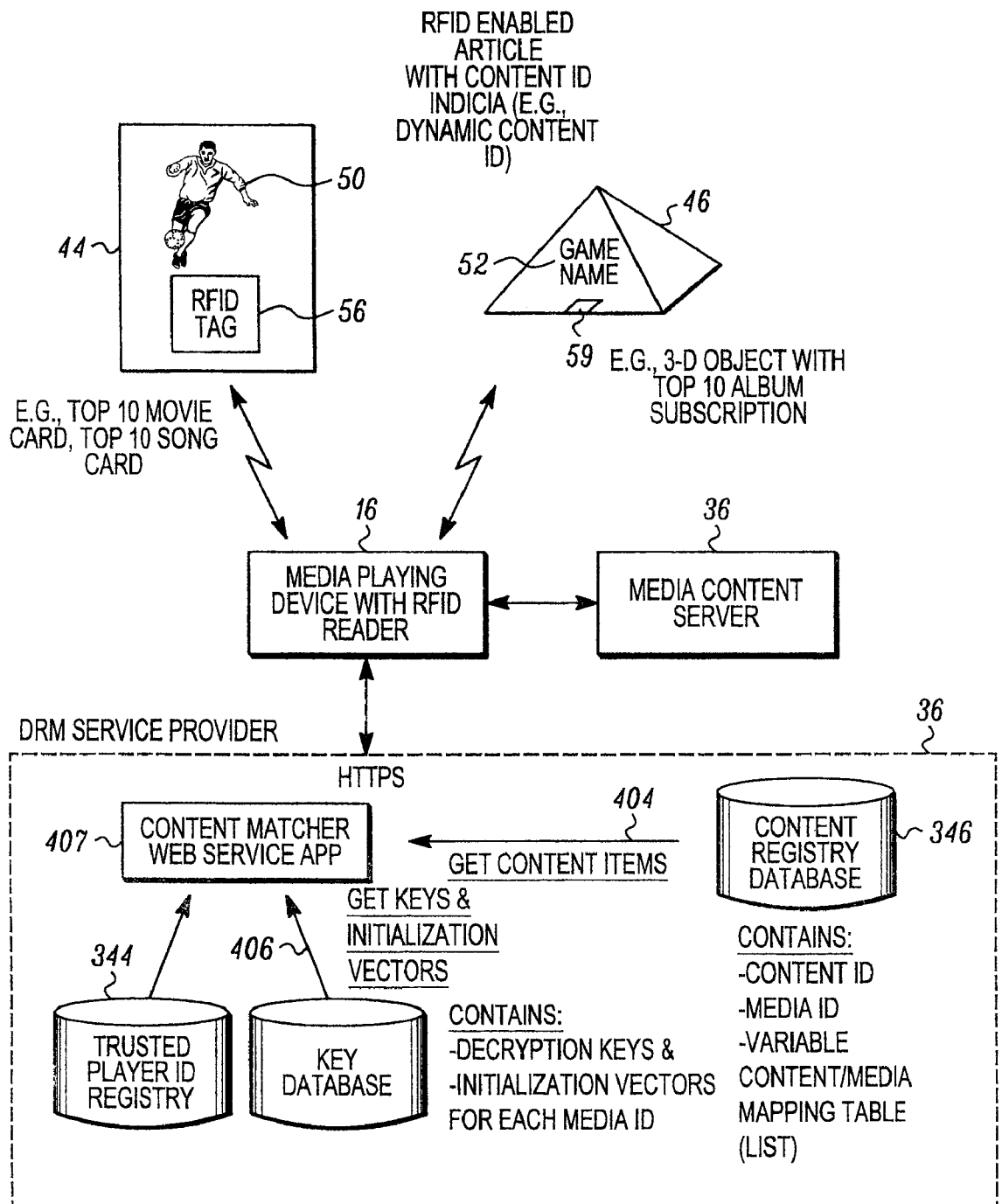
FIG. 15 is a block diagram illustrating one example of a digital audio and/or video playing system in accordance with one embodiment to the invention.

Referring to FIG. 15, like elements from other figures are illustrated and the RFID enabled media objects 14 and 46, in this embodiment contain RFID tags that have content identification information thereon that allows the downloading of media, such as songs, movies or other suitable media, based on a periodically changing media content list. As such, the digital audio and/or video playing system shown in FIG. 15 includes the RFID enabled media objects 44 and 46 or any other suitable objects that have an RFID tag coupled thereto, as well as the trusted digital audio and/or video media playing device 16. The digital rights management service provider 36 includes a controller such as one or more processing devices that carries out the operations as described above including providing the content registry administration interface 700 (see FIG. 7), the content matcher web service application operation 407 and with memory, provides the various databases and registries as previously described. It will be recognized that any other suitable structure may also be used as previously noted. In this example, the list is the contents/ media mapping table in the content registry database 346. To effect a Top 10 list based dynamic content feature, a predetermined number of media elements, such as the Top 10, vary as set forth in the contents/media mapping table in the content registry database 346.

The RFID enabled object 44, in this example, may be a Top 10 movie card with indicia thereon indicating that it is a Top 10 movie card or it may be a Top 10 song card or a Top 5 song card or any other suitable RFID media object. Similarly, the 3-D object 46 may be a Top 10 movie object, Top 10 song object, Top 10 album object or any other suitable RFID enabled object as desired. In this example an owner of the RFID enabled object purchases a subscription for the service. There may be for example, a one time fee that is paid to obtain the card where after the card may have a predetermined life span which may be monitored by the digital rights management service provider. Any other suitable subscription service and operation may also be employed. The controller (FIG. 12) is responsive to RFID tag based information, such as content identification information, obtained by the digital audio and/ or video media playing device 16 and operates to facilitate access to immediate content associated with a periodically changing media content list. In this example, the controller is integrated as part of the digital rights management service provider 36, and provides media identification information such as URLs as described earlier so that the media playing device 16 can download the appropriate media from the media contents server 24. Alternatively, if the controller is located as part of the media contents server 24, the controller may facilitate access to media content by providing the media content directly for download. The digital audio and/or video media playing device 16 then plays the audio and/or video that has been retrieved based on the periodically changing media content list.

Figure 16:
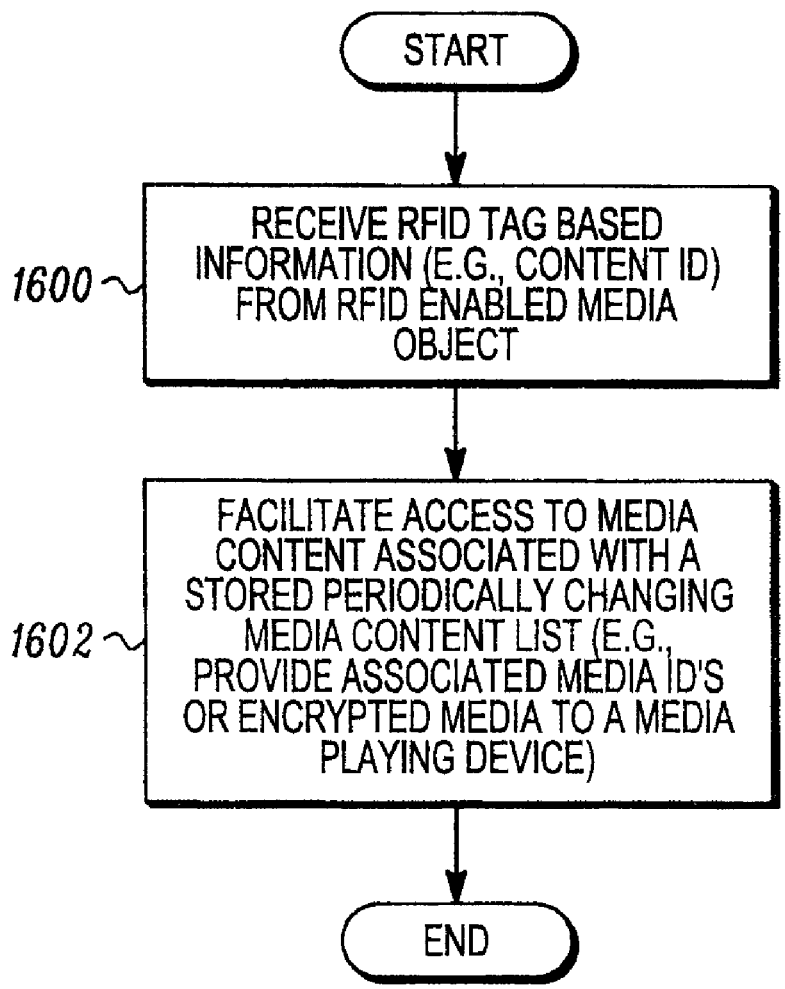
FIG. 16 is a flowchart illustrating one example of a method for providing digital audio and/or video media content in accordance with one embodiment to the invention.

FIG. 16 illustrates a method for providing digital audio and/or video content that includes, as shown in block 1600, receiving RFID tag based information, such as content identification information, from an RFID enabled media object. As shown on block 1602, the method includes facilitating access to media content associated with a stored periodically changing media content list. The method may then end by waiting for another red RFID tag.

In this embodiment, the media content providing device, such as DRM service provider 36 may also include memory that contains the content registry database 346 or other suitable memory that stores the periodically changing media content list. The periodically changing media content list may be the same content/media mapping tables described earlier which may be periodically updated for example, through the content registry administration interface 700 as previously described.

In addition, the controller may select the periodically changing media content list based on a determined geographical location of a media playing unit. For example, instead of selecting a content identifier and associated indexed media ID based on a content ID, the controller may instead use the player ID associated with a media playing device, or any other suitable geographical location indicator to select a particular content ID. For example, if the media playing device is a portable media playing device and embedded for example, in a cell phone or any other suitable device that includes global positioning system information or any other suitable location information, the location information may be communicated in any suitable form to the DRM service provider and a DRM service provider may then select a different content ID or media instead of that identified by the content ID read from the RFID device if desired.

The periodically changing media content list includes data representing for example, one of a predetermined number of variable downloadable movies, a predetermined number (such as 10, 5, or any other suitable number) of variable downloadable songs and a predetermined number of variable downloadable music albums, or any other suitable downloadable media.

As previously described, the DRM service provider 36 includes the content registry administration interface 700 which serves as a user interface operative to allow periodic changing of the media content list, namely changing the media IDs associated with a given content identifier to effect changing of indexed content for download.

The controller 1200 and hence the DRM service provider 36 is operative to send media identification information represented in the stored periodically changing media content lists, for the trusted digital audio and/or video media playing device.

Accordingly, encrypted media and a trusted playing device may be used to provide dynamic media content downloads for the same RFID enabled object. For example, a single media card, ticket, 3-D object, article of clothing or any other suitable RFID enabled object provides a changing Top 10 list of songs, movies or any other suitable media. For example, the card or other object may provide the Top 10 songs from a national pop music chart for a year, or every week, and if songs fall from the list or are added to the list, the content registry database is updated, such as by an operator, or any other suitable fashion, to update the link of media identifiers with the content ID associated with the RFID enabled object so that the same RFID enabled object provides dynamically changing media in a secure manner. Other advantages would be recognized by those having ordinary skill in the art.

The above described devices, systems and methods allow for example, owners of media objects to securely obtain access to online services and encrypted media for playing by the media playing device by simply placing the RFID enabled media object on or near the trusted RFID reader enabled media playing device. No strings of charters need to be entered by a user to gain access to encrypted media and a secure mechanism for delivering and playing media content is provided. In addition, inexpensive media objects such as movie tickets, concert tickets, movie cards or other objects can be used to obtain downloadable bonus media in a user friendly manner. The life of the media object (e.g., tickets etc.) may also be extended since the DRM service provider can dynamically change the media that is downloaded by any given content ID so that the same RFID enabled media object can be used to download different media at different points in time. For example the same concert ticket may allow downloading of different content before a concert versus after a concert. Other advantages will be recognized by those having ordinary skill in the art.

Figure 17:
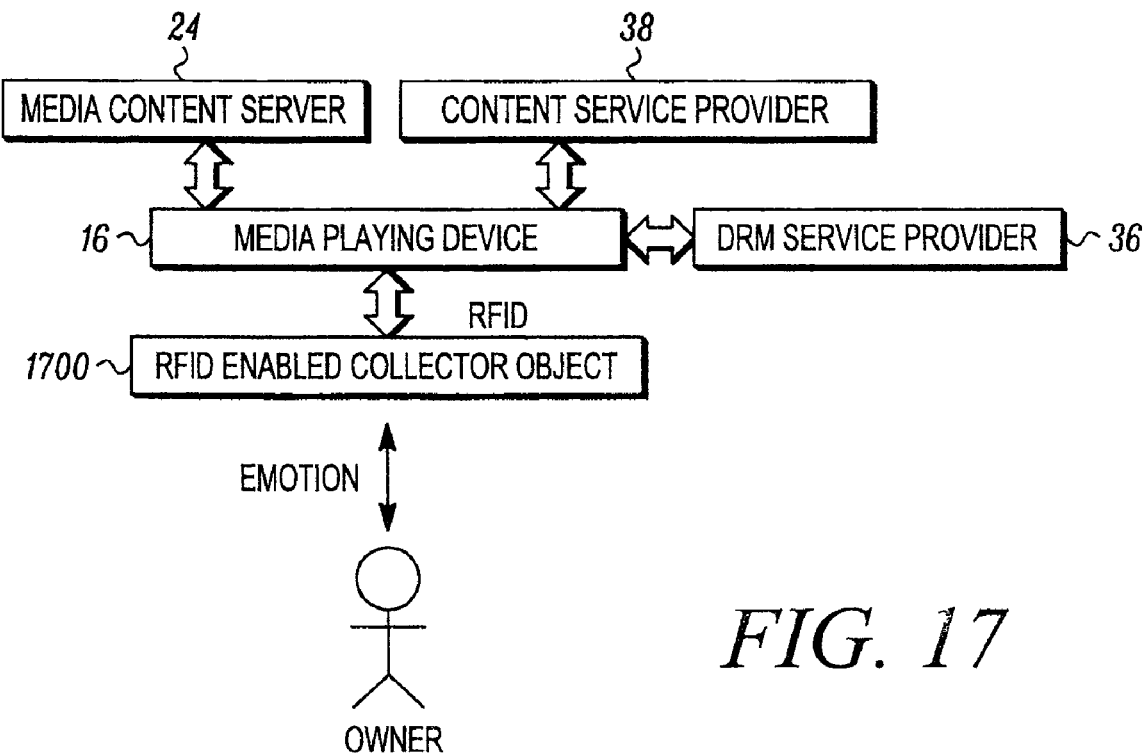
FIG. 17 is a block diagram illustrating one example of a digital media or content system in accordance with one embodiment of the invention.

Other embodiments are illustrated in FIGS. 17-25. FIG. 17 depicts a system in which collector merchandise is augmented by digital content and services. A unique collector item, shown as an RFID enabled collector object 1700, an autographed baseball ball contains an RFID tag. When its owner places the ball on a media playing device, he can view the video of the baseball game in which the ball was used, an interview with the player, and dynamic link to an auction web site where the value of the ball is estimated and some similar articles as shown for sale.

Figure 18:
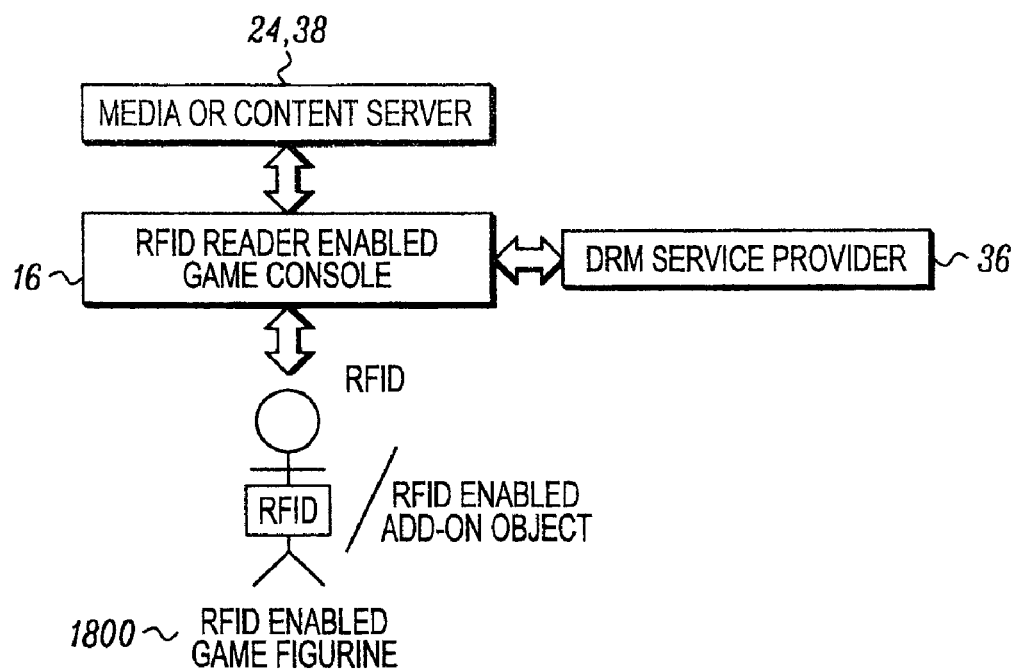
FIG. 18 is a block diagram illustrating one example of a digital media or content system in accordance with one embodiment of the invention.

FIG. 18 depicts a game system in which placing a tagged RFID enabled figurine 1800 close to an RFID reader enabled game console 1802 triggers a game download and starts running the game. The figurine acts as the physical representation of the player in the video game. It is used in subsequent game sessions to log the user in and to store personal settings and high scores. Today, video games can be downloaded or come in a box with one or more CDs or DVDs and a user manual. A single object (e.g. figurine) materializing the game enhances the way players emotionally relate to the games they own. For example, the user buys a tagged warrior figurine in a video game shop. When he places the warrior close to his enhanced game console, the console reads the RFID tag and starts downloading the game software of an online multiplayer heroic fantasy game from a content server based on media ID's from the DRM service provider 36. The game starts and the user plays a warrior character, as the figurine indicates. One month later, the user decides to go back to the shop to buy an axe for his figurine as he cannot manage to find one in the digital game world. His digital warrior gets an axe immediately in the video game after he physically places the RFID enabled axe in the figurine's hand, because the axe contains an RFID tag that links it to the digital game world. The figurine includes an add-on object sensor, such as an optical sensor, mechanical sensor or other suitable sensor to sense when the RFID enabled add-on object is in the figurine's hand.

Figure 19:
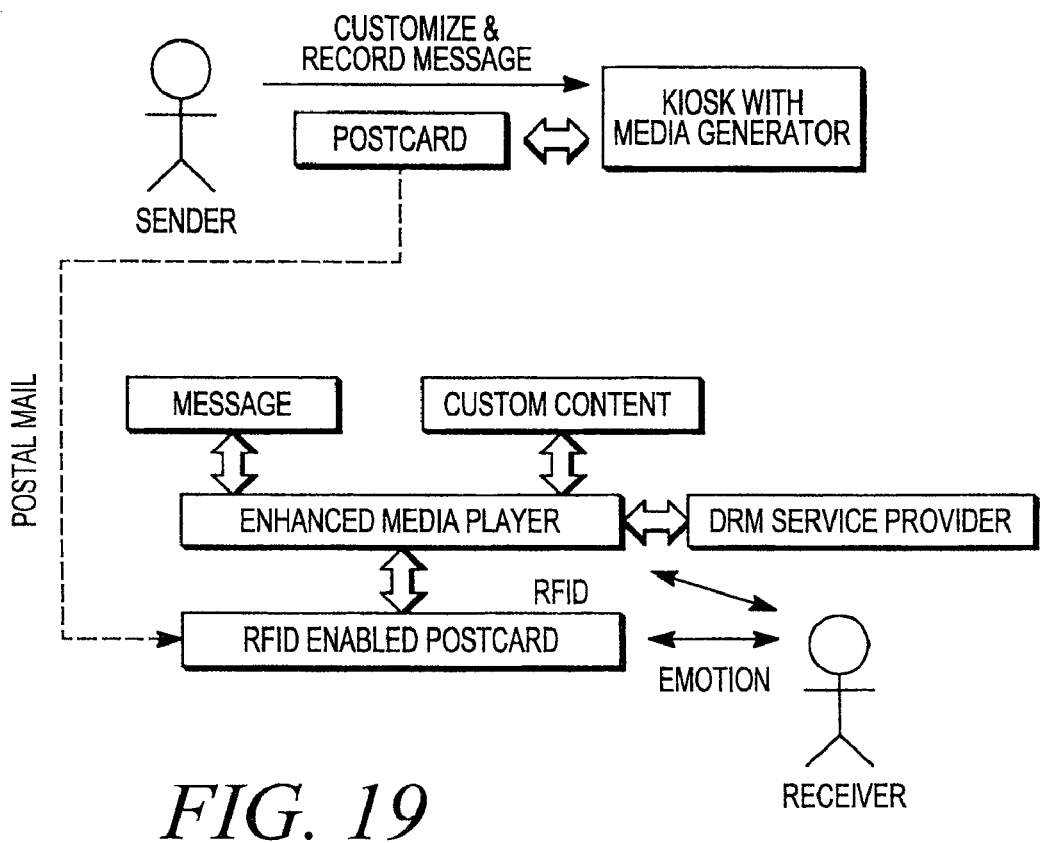
FIG. 19 is a block diagram illustrating one example of a digital media or content system in accordance with one embodiment of the invention.

FIG. 19 depicts a system in which postcards 1900 having embedded RFID tags provide access to media content (such as audio, video, and photos) and online services (such as access to a documentary web site). For example, a user buys a postcard in a holiday resort. After having written a message for a friend on the postcard, he goes to the shop's kiosk. He records a video greeting message and selects a few digital pictures of the landscape as well as a short documentary on the region. He then waves the card next to the kiosk (e.g. DRM server) that has an RFID writer that records the necessary links to view the greeting and posts it. When the friend gets the postcard, he can place the postcard on the enhanced media player to get instant access to the video message, the digital pictures and the documentary.

Figure 20:
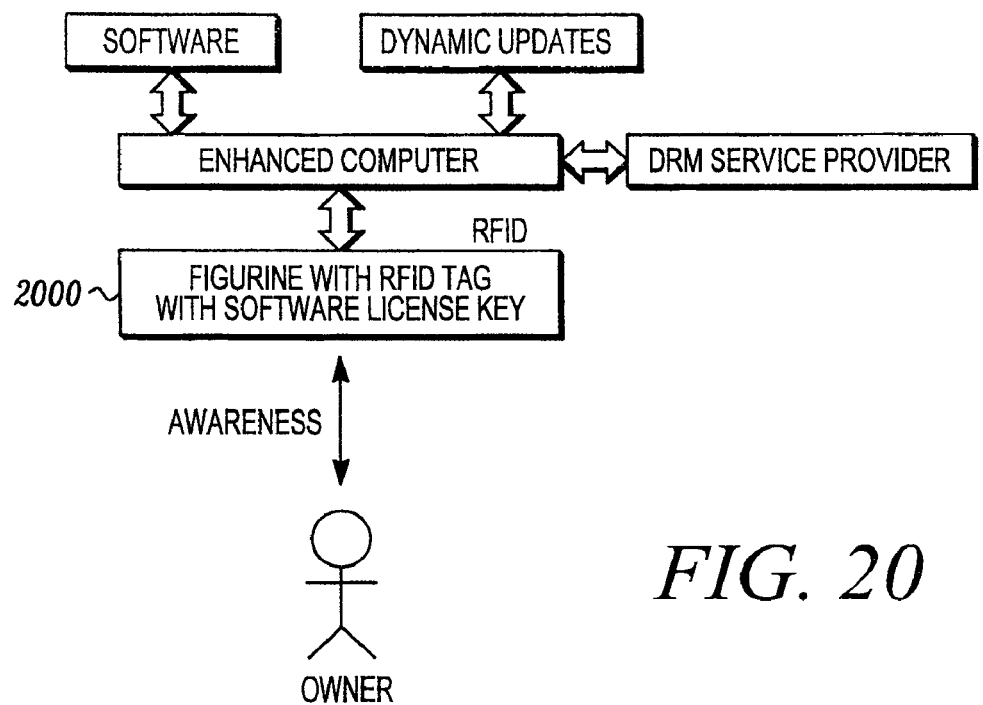
FIG. 20 is a block diagram illustrating one example of a digital media or content system in accordance with one embodiment of the invention.

FIG. 20 depicts a system in which software license keys could be physically materialized by decorative objects (e.g. tagged figurines) and sit next to RFID reader equipped computers. The installed software checks against the license key contained in the RFID tag 2000. Today's software complexity and unpredictable security flaws implies continuous software updates for licensees. Software licenses are mostly invisible to consumers (as they are digital or take the form of dongles plugged at the back of computers). The system increases user awareness of license key presence and limits illegal license copying and exchange. For example, a figurine watchdog sitting next to a workstation symbolizes the fact that the workstation is secure. Indeed, the figurine contains a tag which stores the license for a daily updated antivirus software. The method for secured access to software and dynamic updates is represented as follows:

Get(Tag Info) from Media Player
Media=$Tag_{ID}$+$Content_{ID}$
Send(Media+Media $Player_{ID}$) to DRM Service Provider
Get($Playlist_{ID}$+Σ Keys) from DRM Service Provider
Send($Playlist_{ID}$+Σ Keys) to Media Playing Device
Get AugmentedMedia ($Playlist_{ID}$+Σ Keys) from Media service provider.

Figure 21:
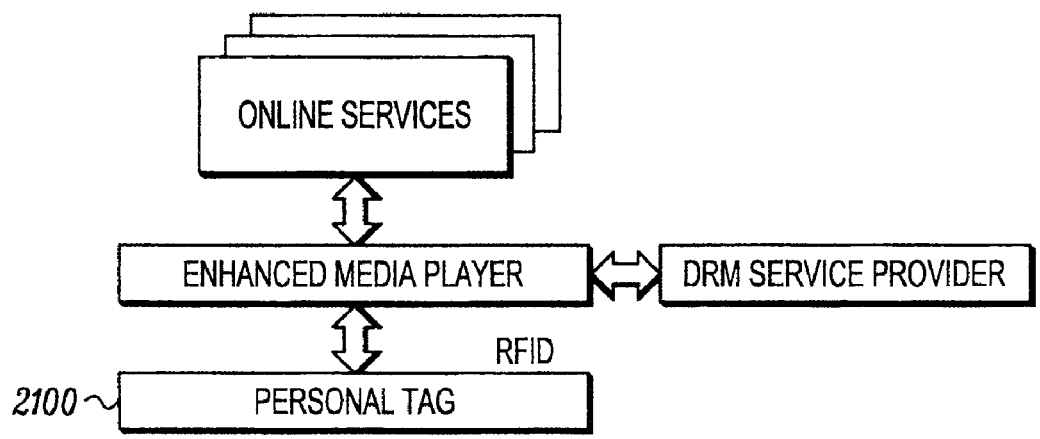
FIG. 21 is a block diagram illustrating one example of a digital media or content system in accordance with one embodiment of the invention.
Figure 22:
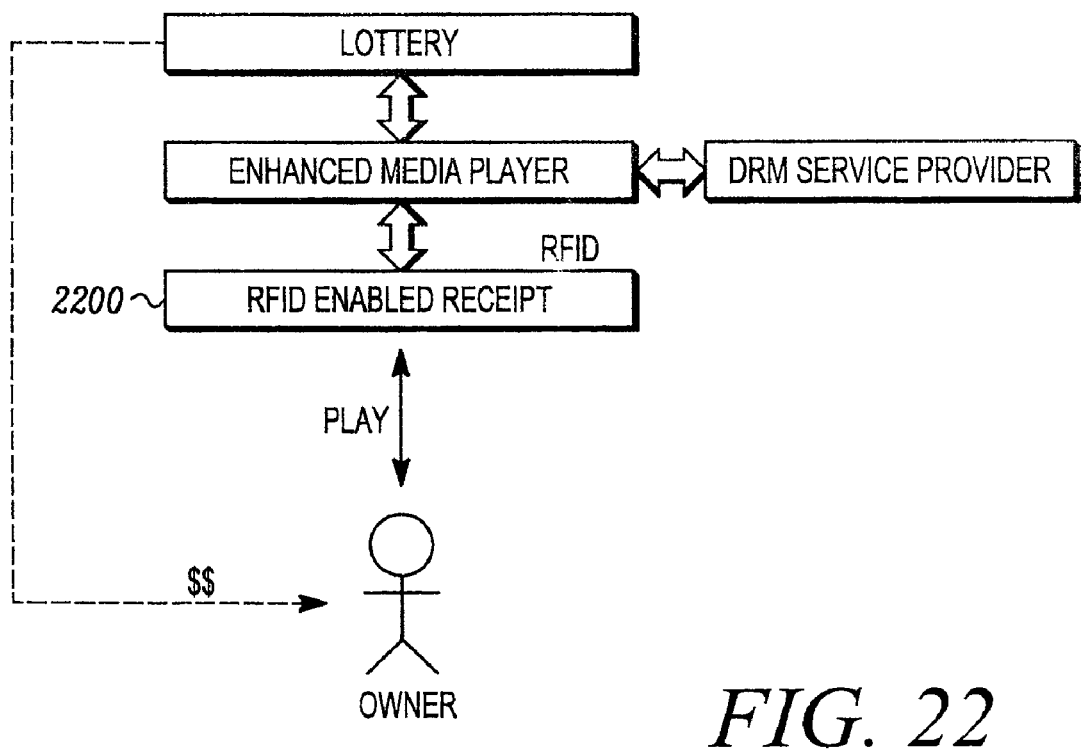
FIG. 22 is a block diagram illustrating one example of a digital media or content system in accordance with one embodiment of the invention.
Figure 23:
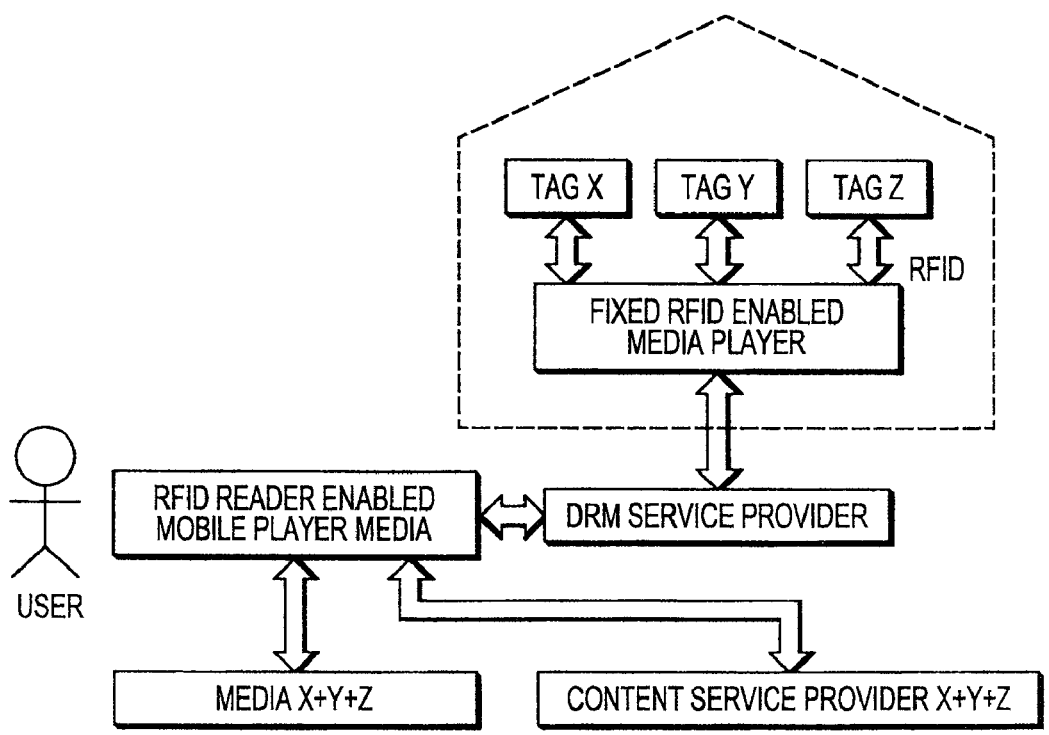
FIG. 23 is a block diagram illustrating one example of a digital media or content system in accordance with one embodiment of the invention.

FIG. 21 depicts a system in which a personal tagged object 2100 can be used to identify a user and provide access to media content and services. Users can chose the form of their authentication token rather than having another credit card. For example, by placing his tagged wallet on the enhanced media player, a user can instantly view his stock portfolio. Combining this identification method with password and/or biometric-based authentication, he can place orders and manage his accounts. The formula for secured access to a set of online personal services and content is represented as follows:

Get(Tag Info) from Media Player
Media=$Tag_{ID}$+$Content_{ID}$
Send(Media+Media $Player_{ID}$) to DRM Server
Get($Playlist_{ID}$+Σ Keys) from DRM Server Databases
Send($Playlist_{ID}$+Σ Keys) to Media Player
Get AugmentedMedia ($Playlist_{ID}$+Σ Keys) from Media Service Provider FIG. 22 depicts a system in which media objects can be used to engage the owner in games. The secure and dynamic aspect of the system enables lottery and betting applications. For example, a luxury shop delivers payment receipts containing RFID tags. Each RFID enabled receipt 2200 provides access to advertisement about items that are similar to the ones that were bought. A monthly lottery is performed upon all the delivered receipts. Customers who have kept their receipts can check at any time if one or their receipts has won the lottery. The formula for secured access to online lottery and betting services is as follows:

Get(Tag Info) from Media Player
Media=$Tag_{ID}$+$Content_{ID}$
Send(Media+Media $Player_{ID}$) to DRM Server
Get($Playlist_{ID}$+Σ Keys) from DRM Server Databases
Send($Playlist_{ID}$+Σ Keys) to Media Player
Get AugmentedMedia ($Playlist_{ID}$+Σ Keys) from Media service provider FIG. 23 depicts a system in which users build a play list of media that can be accessed remotely on a mobile device, by placing the desired tagged objects close to a fixed device equipped with an RFID reader. The fixed device and the mobile player are linked and communicate via a secure network. This system enables people to remotely access the content of their media objects without altering the overall security mechanism. For example, the user buys an RFID enabled mobile music player. The fixed device contains an RFID reader also and is wirelessly connected to the network. The user places the fixed player on a shelf at home. He owns several media objects; he could play them on his mobile player by taking the objects with him, but he prefers to place the objects on the fixed player and sequentially and physically builds a play list of media he can access anywhere and at anytime on his mobile player. Every time the mobile player plays a music album, it wirelessly checks the presence of the corresponding object on the fixed player. If the object is removed, the album is instantly removed from the play list.

Figure 24:
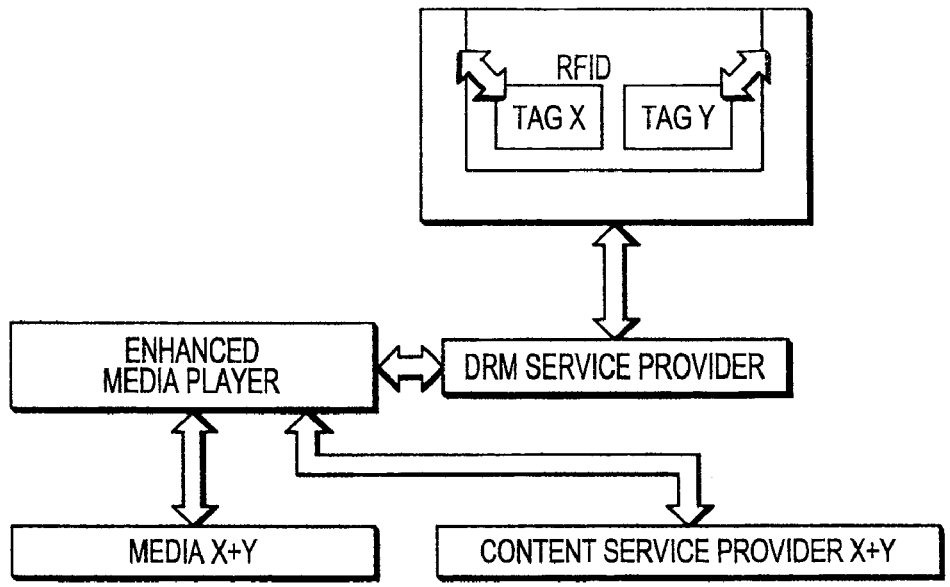
FIG. 24 is a block diagram illustrating one example of a digital media or content system in accordance with one embodiment of the invention.

FIG. 24 depicts a system in which tagged objects are placed into object containers that are capable of reading embedded tags. The tag container concept enables tangible content management for end users. For example, the user stores media objects on his personal shelf.

The shelf is connected to his media player and performs dynamic inventory management of the media it contains. The media player provides relevant suggestions about products that might interest the user based on the user's media collection. Furthermore, it informs the user when some new content has been added to one of his objects.

Figure 25:
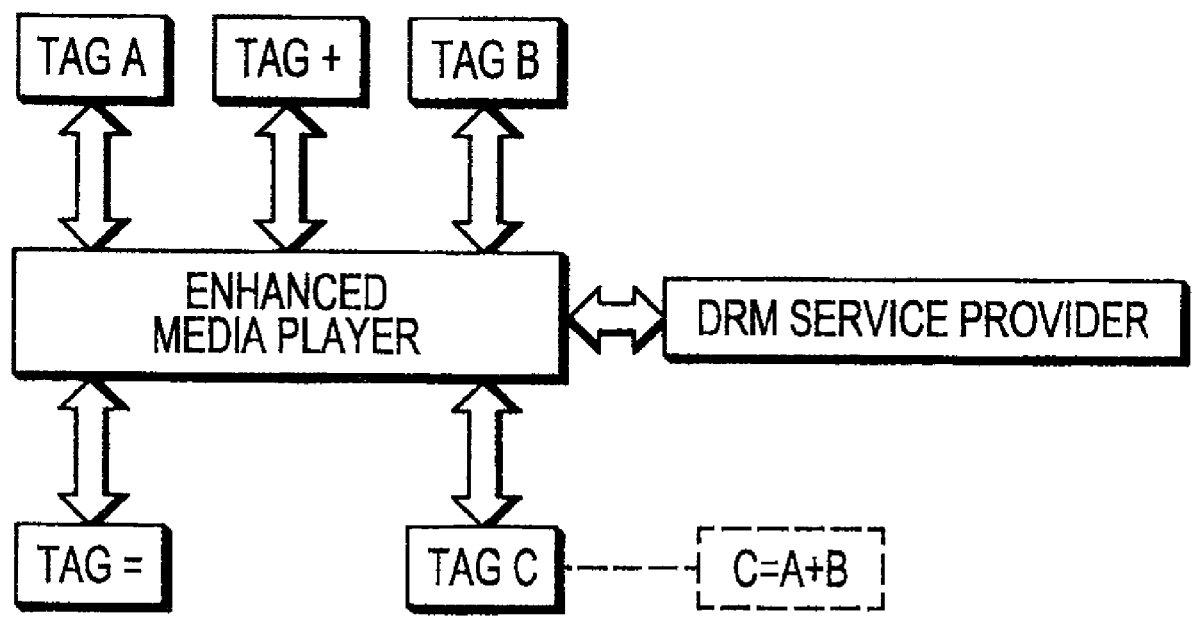
FIG. 25 is a block diagram illustrating one example of a digital media or content system in accordance with one embodiment of the invention.

FIG. 25 depicts a system in which specific tags are used as operators. These tags are used as instructions of a programming, language to compose a procedure that is executed on an enhanced media player or media composer. Using RFID enabled objects as instruction metaphors enables creative human-computer interactions. Artists would use an enhanced media composer to build content. Consumers use control tags to interface with their media players. For example, if a user wants to create a custom movie composed of several video sequences, music tracks, and pointers to online content, he starts by waving an RFID enabled transparent box in front of the enhanced media composer. This box represents the placeholder for the final movie. He waves an RFID enabled white triangle, symbolizing a fade in effect. Then he waves a tag containing the first video sequence; the video plays. He waves a tagged pair of scissors to cut the video sequence. And then, a glue pot, followed by another tag representing the second video sequence to be appended to the movie. When he reaches the last video sequence, he waves a tagged black triangle to trigger a fade out effect. The transparent box now contains the custom movie.

It will be recognized that the order of the various steps described herein may be performed in any suitable order and that the above detailed description of the invention and the examples described therein have been presented for the purposes of illustration and description only and not limitation. It is therefore contemplated that the present invention cover any and all modifications, variations or equivalents that fall within the spirit and scope of the basic underlying principles disclosed above and claimed herein.

We claim:

1. An audio and/or video media content providing device comprising:
    memory containing a stored periodically changing media content list comprising a mapping table that maps static content identification information with varying media identification information;
    at least one controller operatively responsive to RFID tag based information obtained from a remote RFID enabled media object, wherein the RFID tag based information includes content identification information stored on an RFID tag located on the remote RFID enabled object, said at least one controller being operative to provide, based on said content identification information, said varying media identification information to facilitate access to media content associated with said stored periodically changing media content list, wherein said varying media identification information identifies a location of where the media content is stored and wherein the controller selects the periodically changing media content list based on a determined geographic location of a media playing unit.

2. The audio and/or video media content providing device of claim 1 wherein the stored periodically changing media content list includes data representing at least one of: a predetermined number of variable downloadable movies, a predetermined number of variable downloadable songs and a predetermined number of variable downloadable music albums.

3. The audio and/or video media content providing device of claim 1 wherein the controller includes a user interface operative to allow periodic changing of the media content list.

4. The audio and/or video media content providing device of claim 1 wherein the remote RFID enabled media object includes at least one of: an RFID enabled ticket, an RFID enabled card and an RFID enabled 3-D object.

5. The audio and/or video media content providing device of claim 1 wherein the controller is operative to send media identification information represented in the stored periodically changing media content list, for a trusted digital audio and/or video media playing device having a radio frequency identification tag reader operatively coupled therewith to read RFID tag information from the RFID tag and that is operative to play media obtained based on the sent media identification information.

6. A digital audio and/or video playing system comprising:
    an RFID enabled media object having an RFID tag coupled thereto;
    a trusted digital audio and/or video media playing device having a radio frequency identification tag reader operatively coupled therewith to read RFID tag information from the RFID tag, the RFID tag information including content identification information;
    memory containing a stored periodically changing media content list comprising a mapping table that maps static content identification information with varying media identification information; and
    a controller operatively responsive to read RFID tag based information obtained by the digital audio and/or video media playing device and operative to provide, based on said content identification information, said varying media identification information to facilitate access to media content associated with said periodically changing media content list, wherein said varying media identification information identifies a location of where the media content is stored, and
    wherein the digital audio and/or video media playing device is operative to play audio and/or video retrieved based on the periodically changing media content list.

7. The system of claim 6 further comprising a media content server that provides encrypted media content identified by the periodically changing media content list for the trusted digital audio and/or video media playing device and wherein the controller provides digital rights management services.

8. A method for providing digital audio and/or video media content comprising:
    receiving RFID tag based information obtained from a remote RFID enabled media object, the RFID tag information including content identification information;
    providing, based on said content identification information, varying media identification information mapped to said content identification in a stored periodically changing media content list, wherein said stored periodically changing media content list is selected based on a determined geographic location of a media playing unit; and
    facilitating access to media content associated with said stored periodically changing media content list, wherein said varying media identification information identifies a location of where the media content is stored.

9. The method of claim 8 wherein the stored periodically changing media content list includes data representing at least one of: a predetermined number of variable downloadable movies, a predetermined number of variable downloadable songs and a predetermined number of variable downloadable music albums.

10. The method of claim 8 comprising periodically changing the media content list in response to user input from a user interface.

11. The method of claim 8 comprising sending media identification information represented in the stored periodically changing media content list, for a trusted digital audio and/or video media playing device having a radio frequency identification tag reader operatively coupled therewith to read RFID tag information from the RFID tag and that is operative to play media obtained based on the sent media identification information.

* * * * *